United States Patent
Yeganeh et al.

(10) Patent No.: US 11,590,447 B2
(45) Date of Patent: Feb. 28, 2023

(54) POROUS LIQUID AND METHODS OF MAKING AND USING THE SAME

(71) Applicant: ExxonMobil Technology And Engineering Company, Annandale, NJ (US)

(72) Inventors: Mohsen S. Yeganeh, Newtown, PA (US); Pavel Kortunov, Flemington, NJ (US); P. Scott Northrop, Spring, TX (US); Xiaozhou Zhang, Bridgewater, NJ (US); Giovanni Pilloni, Jersey City, NJ (US); Ning Ma, Whitehouse Station, NJ (US); Robert J. Colby, Annandale, NJ (US); Qiuzi Li, Clinton, NJ (US); Zarath M. Summers, High Bridge, NJ (US); Matthew S. Ide, Doylestown, PA (US)

(73) Assignee: Exxon Mobil Technology and Engineering Company, Annandale, NJ (US)

( * ) Notice: Subject to any disclaimer, the term of this patent is extended or adjusted under 35 U.S.C. 154(b) by 364 days.

(21) Appl. No.: 16/660,029

(22) Filed: Oct. 22, 2019

(65) Prior Publication Data

US 2020/0147545 A1    May 14, 2020

Related U.S. Application Data

(60) Provisional application No. 62/757,206, filed on Nov. 8, 2018, provisional application No. 62/757,209, filed on Nov. 8, 2018.

(51) Int. Cl.
*B01D 53/14* (2006.01)
*B01D 53/22* (2006.01)
(Continued)

(52) U.S. Cl.
CPC ..... *B01D 53/1493* (2013.01); *B01D 53/1475* (2013.01); *B01D 53/1487* (2013.01);
(Continued)

(58) Field of Classification Search
None
See application file for complete search history.

(56) References Cited

U.S. PATENT DOCUMENTS

| 3,758,404 A | 9/1973 | Clonts et al. |
| 4,267,978 A | 5/1981 | Manteufel |
| (Continued) | | |

FOREIGN PATENT DOCUMENTS

| WO | 2017055615 A1 | 4/2017 |
| WO | 2018/191523 A1 | 10/2018 |

OTHER PUBLICATIONS

The Partial Search Report and Provisional Opinion of PCT/US2019/057387 dated Feb. 10, 2020.
(Continued)

*Primary Examiner* — Jason M Greene
(74) *Attorney, Agent, or Firm* — C. Tumey Law Group PLLC

(57) ABSTRACT

The present disclosure relates to a porous liquid or a porous liquid enzyme that includes a high surface area solid and a liquid film substantially covering the high surface area solid. The porous liquid or porous liquid enzyme may be contacted with a fluid that is immiscible with the liquid film such that a liquid-fluid interface is formed. The liquid film may facilitate mass transfer of a substance or substrate across the liquid-fluid interface. The present disclosure also provides methods of performing liquid-based extractions and enzymatic reactions utilizing the porous liquid or porous liquid enzyme of the present disclosure.

21 Claims, 14 Drawing Sheets

(51) Int. Cl.

| | |
|---|---|
| *B01D 67/00* | (2006.01) |
| *B01D 69/14* | (2006.01) |
| *B01D 53/18* | (2006.01) |
| *B01D 53/26* | (2006.01) |
| *B01J 20/08* | (2006.01) |
| *B01J 20/10* | (2006.01) |
| *B01J 20/22* | (2006.01) |
| *B01J 20/26* | (2006.01) |
| *B01J 20/28* | (2006.01) |
| *B01J 21/08* | (2006.01) |
| *B01J 31/00* | (2006.01) |
| *B01J 31/26* | (2006.01) |
| *B01J 35/06* | (2006.01) |
| *C02F 1/26* | (2006.01) |
| *C02F 3/34* | (2006.01) |
| *C02F 101/34* | (2006.01) |

(52) U.S. Cl.
CPC ........... *B01D 53/18* (2013.01); *B01D 53/229* (2013.01); *B01D 53/263* (2013.01); *B01D 67/0079* (2013.01); *B01D 67/0093* (2013.01); *B01D 69/148* (2013.01); *B01J 20/08* (2013.01); *B01J 20/103* (2013.01); *B01J 20/22* (2013.01); *B01J 20/261* (2013.01); *B01J 20/28023* (2013.01); *B01J 20/28045* (2013.01); *B01J 21/08* (2013.01); *B01J 31/003* (2013.01); *B01J 31/26* (2013.01); *B01J 35/06* (2013.01); *C02F 1/26* (2013.01); *C02F 3/342* (2013.01); *B01D 2239/02* (2013.01); *B01D 2239/1208* (2013.01); *B01D 2252/2026* (2013.01); *B01D 2252/20421* (2013.01); *B01D 2252/20478* (2013.01); *B01D 2252/20484* (2013.01); *B01D 2252/40* (2013.01); *B01D 2252/502* (2013.01); *B01D 2252/602* (2013.01); *B01D 2325/02* (2013.01); *B01D 2325/06* (2013.01); *C02F 2101/34* (2013.01)

(56) References Cited

U.S. PATENT DOCUMENTS

| | | | | |
|---|---|---|---|---|
| 5,393,429 | A | 2/1995 | Nakayama et al. | |
| 6,293,526 | B1 | 9/2001 | Fischer et al. | |
| 6,402,818 | B1 | 6/2002 | Sengupta et al. | |
| 8,574,704 | B2 | 11/2013 | Smith et al. | |
| 2013/0034695 | A1* | 2/2013 | Smith ................... | B64D 15/06 428/143 |
| 2013/0312608 | A1 | 11/2013 | Zaman | |
| 2015/0076732 | A1* | 3/2015 | Kemmer ................ | B29C 64/118 425/375 |
| 2015/0196940 | A1 | 7/2015 | Aizenberg et al. | |
| 2018/0361312 | A1* | 12/2018 | Dutra e Mello ... | B01D 53/1493 |
| 2019/0176080 | A1* | 6/2019 | Liu ......................... | B01D 53/18 |
| 2019/0299293 | A1* | 10/2019 | Lynch ................ | B01D 53/1475 |
| 2020/0039868 | A1* | 2/2020 | Rapp ..................... | C03B 19/00 |

OTHER PUBLICATIONS

The Partial Search Report and Provisional Opinion of PCT/US2019/057378 dated Feb. 10, 2020.

The International Search Report and Written Opinion of PCT/US2019/057382 dated Feb. 10, 2020.

Zaini, et al, Adsorption of Carbon Dioxide on Monoethanolamine (MEA)-Impregnated Kenaf Core Fiber by Pressure Swing Adsorption System, Jurnal Teknologi, Mar. 2014, pp. 11-16, Penerbit UTM Press.

Stepankova, et al, Strategies for Stabilization of Enzymes in Organic Solvents, ACS Catalysis, Oct. 2013, pp. 2823-2836, American Chemical Society.

O'Reilly, et al, Porous Liquids, Chemistry—A European Journal, Mar. 2007, pp. 3021-3025, vol. 13, WILEY-VCH Verlag GmbH & Co. KGaA, Weinheim.

Bilek, et al, Plasma Modified Surfaces for Covalent Immobilization of Functional Biomolecules in the Absence of Chemial Linkers: Towards Better Biosensors and a New Generation of Medical Implants, Biophysical Reviews, May 2010, pp. 55-65, vol. 2, issue 2, Springer-Verlag.

Kawakami, et al, Immobilization of Glucose Oxidase on Polymer Membranes Treated by Low-Temperature Plasma, Biotechnology and Bioengineering, Jul. 1988, pp. 369-373, vol. 425, John Wiley & Sons, Inc.

Xin, et al, Liquid-liquid equilibria for the extraction of furfural from aqueous solution using different solvents, Fluid Phase Equilibria, Jun. 2016, pp. 393-401, Elsevier B.V.

Xu, et al, Preparation and characterization of novel CO2 "molecular basket" adsorbents based on polymer-modified mesoporous molecular sieve MCM-41, Microporous and Mesoporous Materials, Aug. 2003, pp. 29-45, vol. 62, Elsevier Inc.

Cao, et al, Capture of carbon dioxide from flue gas on TEPA-grafted metal-organic framework Mg2(dobdc), Journal of Environmental Sciences, Oct. 2013, pp. 2081-2087, vol. 25, issue 10, Elsevier.

Hicks, et al, Designing Adsorbents for CO2 Capture from Flue Gas-Hyperbranched Aminosilicas Capable of Capturing CO2 Reversibly, Journal of American Chemical Society, Feb. 2008, pp. 2902-2903, vol. 130, American Chemical Society.

* cited by examiner

~60% Furfural Removal (2 g/L)

POROUS LIQUID AND METHODS OF MAKING AND USING THE SAME

CROSS-REFERENCE TO RELATED APPLICATIONS

This application claims priority to U.S. Provisional Application No. 62/757,206 filed Nov. 8, 2018, and U.S. Provisional Application No. 62/757,209 filed Nov. 8, 2018, the entirety of each of which are herein incorporated by reference in their entirety.

FIELD

The present disclosure provides porous liquids and porous liquid enzymes and methods of using the same. In particular, a porous liquid of the present disclosure may be utilized to absorb or extract a substance from a working fluid and a porous liquid enzyme of the present disclosure may be utilized to catalyze a reaction with a substrate in a working fluid.

BACKGROUND

Interaction or mass transfer across a liquid/fluid interface, wherein the fluid (also referred to as working fluid) can be liquid or gas, plays an important role in many processes, including petrochemical-related processes such as liquid-based extraction and bioconversion.

In a liquid-based extraction, a working fluid that contains species that need to be separated and removed is brought in contact with an appropriate liquid, i.e., a liquid that will extract or absorb the species to be removed. For simplicity, the species that must be removed may be referred to as contaminants. An appropriate selection of the liquid and liquid/fluid contactors allows for a mass transfer of the contaminant(s) from the working fluid to the liquid for separation and removal. Liquid-based absorption/extraction has been practiced in many important industrial applications. For example, removal of carbon dioxide from flue gas is carried out by contacting liquid amine or caustic solution (the liquid) with flue gas (the working fluid). Acidic $CO_2$ molecules transfer across the flue gas/liquid interface (i.e., mass transfer) into the basic amine (or caustic solution such as KOH) to selectively react with the same and be removed from the gas stream (the working fluid). This process can be highly beneficial for the removal of $CO_2$, but the process currently suffers due to the large amine dilution with water necessary to control viscosity and low gas-liquid contactor efficiency. As a result, the process requires large contactors and regenerators.

Similarly, removal of water molecules from a wet natural gas has been carried out by a liquid-based interaction for many years. The wet gas (the working fluid) is brought in contact with a glycol-based liquid (the liquid), such as triethylene glycol (TEG) liquid. Water molecules transfer across the TEG/natural gas interface into the liquid (mass transfer) where the water molecules are preferentially absorbed by hydrogen bonding with TEG molecules, thereby resulting in removal of the water molecules from the gas stream (i.e., the dehydration of the natural gas).

Another important example of a liquid-based extraction is the removal of reaction inhibitors, such as furfural from an aqueous solution of sugar. Sugar produced from plant waste materials contains furfural, which is detrimental to the conversion of sugar to biofuel. Thus, before converting sugar to biofuel, the inhibitor furfural must be removed from the sugar.

An effective liquid-based extraction requires an effective mass transport of the contaminants across the liquid/fluid interfaces. The efficiency of liquid-based extraction/absorption processes depends on the mass transfer rate across the liquid/fluid interface, which is strongly affected by the interfacial surface area between the liquid and fluid. Therefore, a high surface area between the liquid and the fluid is favored for profitable/efficient operations. As mentioned above, many commercial processes achieve higher surface areas by rigorously mixing the working fluid with the liquid in a tower with one or more contactors, which are designed to increase surface area between the fluid and the liquid in a fixed volume. This approach, however, requires high volumes of material and consumes a significant amount of energy. Even then, a substantial amount of liquid and fluid do not interact because of the poor surface-to-volume ratio. As a result, a substantial amount of the liquid and fluid still remain unused and ineffective.

The need for high energy mixing and large volume containers, as well as the large volume of unused fluid-liquid, often make the capital expenditure and operational expenditure of current practices high. Thus, there is a need to increase the surface area between the working fluid and the liquid (i.e., the interfacial surface area) in liquid-based extraction methods. This could reduce the required volume of materials in the extraction method and reduce capital and operational expenditure by reducing the required liquid-fluid contactor size.

In addition to molecular separation, mass transfer across the liquid/fluid interface is critical for reaction and product upgrading. For example, in bioconversion, enzymes (biological catalysts) are used to react with hydrocarbon species to generate high value products. Thus, enzymes can be utilized to remove heteroatoms or transform oil components to improve the yield and quality of the oil, as well as its refined products. The use of enzymes provides the potential processing advantages of low pressure and low temperature. Utilization of enzymes does not require hydrogen, and has low chemical costs with minimal equipment investment when compared to refinery operations. However, the majority of natural enzymes display lower catalytic efficiency or are denaturized in organic solvents compared with native aqueous solutions.

Many enzymatic reactions are performed with enzymes that have been immobilized on a substrate, which is one of the most common methods of improving enzyme stability in organic solvents. Additional advantages to utilizing immobilized enzymes include: (1) multiple reuses of the biocatalyst; (2) easy separation of the enzyme from the product; (3) flexibility in reactor design; (4) ability to regenerate the carrier; (5) the possibility to operate in both aqueous organic solvents; and (6) the possibility to operate in a continuous mode using column rectors. Thus, most of the current research focuses on the common strategies used for enzyme immobilization, including adsorption via hydrophobic/ionic interactions, covalent binding, cross-linking, entrapment, etc. ("Strategies for Stabilization of Enzymes in Organic Solvents," ACS Catalysis 2013, 3:2823-2836).

Such immobilization methods, however, face many limitations for scaling up and feasibility in industrial applications. In particular, the above mentioned immobilization methods are typically time-consuming, labor-intensive, costly, and require toxic chemicals and complicated procedures. Thus, there is need for efficient, simpler, and lower cost methods of immobilizing enzymes that do not require toxic chemicals.

SUMMARY

The present disclosure describes a porous liquid and a porous liquid enzyme and methods of using the same. In particular, the inventors surprisingly discovered that use of a porous liquid of the present disclosure is a cost effective and extremely efficiently method to absorb or extract a substance from a working fluid. Similarly, use of a porous liquid enzyme of the present disclosure is a cost effective and remarkably efficient method to catalyze a reaction with a substrate in a working fluid. In particular, an aspect or the present disclosure provides a porous liquid or porous liquid enzyme (i.e., the article) that includes a high surface area solid, and a liquid that encapsulates the solid or infuses within the solid surface roughness or textures to substantially cover the high surface area solid (e.g., at least 30%, at least 50%, at least 70%, or at least 90% of the surface or surface area of the high surface area solid is covered by the infused or encapsulating liquid film). The working fluid is immiscible with the infused or encapsulating liquid and forms a liquid-fluid interface. The liquid of this disclosure interacts with the working fluid at the liquid/fluid interface. The solid surface of the high surface area solid may have to be chemically and/or physically functionalized to hold an infused liquid and/or become encapsulated by the liquid. Physical functionalization includes texturing or roughening the solid surface. Chemical functionalization includes any surface chemical alteration that affects the wettability of liquid on the solid.

In certain aspects, the high surface area solid includes at least one of a rough surface, a textured surface (e.g., a surface with a matrix of solid features), or both. For example, the surface, which may be rough, can include microstructures and/or nanostructures on the surface. In another embodiment, the high surface area solid is a fiber with a rough and/or textured surface.

In certain embodiments, the porous liquid includes liquid that is infused within at least a portion of the texture of the high surface area solid. This is referred to herein as a liquid infused surface, infused liquid, or the like. When the liquid covers the entire top surface of the texture, it is referred herein to as a liquid encapsulated solid, encapsulation, or the like. Both a liquid infused surface and a liquid encapsulated solid may be referred to herein as a liquid impregnated solid.

In some embodiments, the liquid film may include an enzyme and/or is a film that facilitates mass transfer of at least one substance or substrate across a liquid-fluid interface formed with a fluid that is immiscible with the liquid film.

In some embodiments, the surface area of the high surface area solid is greater than 0.001 m$^2$/g (e.g., about 0.001 m$^2$/g to about 45 m$^2$/g). The surface area, S, of the high surface area solid per volume of the high surface area solid, S/V, is greater than 180 m$^{-1}$, greater than 500 m$^{-1}$, or greater than 1000 m$^{-1}$. For purposes of this calculation, surface area, S, includes the surface area provided by both the internal-facing and external-facing surface areas of the structure. However, given that it is difficult to account for micro-scale surface roughness, the calculation of S presumes that the internal-facing and external-facing surfaces are smooth. For example, the calculation of S includes the additional surface area provided by the cellular structures inside the matrix, but presumes for simplicity that the surfaces of the walls making up the cells are smooth. The system volume, V, is defined as the geometric volume of the structure based only on the dimensions of the external surfaces, and presuming those surfaces are smooth. In other words, V is calculated in a simplified manner that presumes a solid structure defined by its external surfaces, with no micro-textures on those external surfaces and no internal matrix. These calculations can be performed by a software program such as nTopology Element or Autodesk NetFabb.

In particular embodiments, the high surface area solid has been activated (e.g., plasma activated or temperature activated such as in a high temperature air oven) to enhance and/or help facilitate adequate coverage by the infused liquid or encapsulating liquid film. In some embodiments, the temperature for surface activation (e.g., the temperature of the air oven) is greater than 300° C. or greater than 400° C., but always lower than the melting temperature of the solid substrate.

In further embodiments, the high surface area solid or the high surface area solid with a rough surface includes a matrix of solid features that are spaced sufficiently close to stably contain the liquid film therebetween and/or therewithin. For example, the solid feature (i.e., at least one of the length, the width, the height, or a combination thereof) may have an average dimension in a range of about 0.1 μm to about 1000 μm (e.g., about 1 μm to about 200 μm). Furthermore, the space or average space between solid features may be in the range of about 0.1 μm to about 500 μm (e.g., about 1 μm to 500 μm).

In some embodiments, the high surface area solid includes wool, glass, glass wool, polyethylene, insoluble fibers, polyethylene wool, quartz, quartz wool, fibers, polymer fibers, additive manufactured structures (such as a 3D printed structure or laser metal deposition manufactured structure), or a combination thereof.

In some embodiments, the high surface area solid is made of a material that is not reactive with the liquid film.

In some embodiments, the liquid film includes at least one of an amine (e.g., monoethanolamine, tetraethylenepentamine), an alkali metal hydroxide (e.g., potassium hydroxide, lithium hydroxide, sodium hydroxide, or combinations thereof), glycol (e.g., triethylene glycol), an enzyme (e.g., cytochrome c), or combinations thereof.

In some embodiments, the liquid film has a thickness from the bottom of the roughness or the texture to the top surface of the liquid film no greater than 1400 μm (e.g. a thickness no greater than 1000 μm, about 10 μm to about 1000 μm, or about 10 μm to about 100 μm).

In some embodiments, the performance index (PI) of the system is greater than 150.0 m$^{-1}$ or greater than 500.0 m$^{-1}$. PI is defined as PI=(V1/V)(A1/V). V1 and A1 are the volume and surface area of the impregnating liquid, respectively. V1 may be determined by weighing the high surface area solid before and after applying the impregnating liquid, and then converting the mass difference (e.g., the mass of liquid held by the apparatus) into a volume using the density of the liquid. Where the liquid perfectly or nearly-perfectly wets all of the surfaces of the high surface area solid, A1 is essentially equal to S, the surface area of the high surface area solid. In such cases, S is substituted for A1 in the calculation of PI for simplicity. For purposes of the PI calculation herein, perfect or near-perfect wetting is presumed and thus S is used for A1 in the calculation of PI. The amount of liquid that the apparatuses disclosed herein uptake suggests that this assumption is reasonable. Systems with a PI greater than 150 m$^{-1}$ are more efficient, and thus can be smaller and less expensive than conventional systems.

A further aspect of the present disclosure provides a method of performing a liquid-based extraction, the method comprising: providing a porous liquid comprising a high surface area solid and a liquid film substantially covering the high surface area solid (e.g., at least 30%, at least 50%, at least 70%, or at least 90% of the surface or surface area of the high surface area solid is covered and it has a PI value of at least of 150 m$^{-1}$) that is formulated to extract or absorb at least one substance from a fluid that is immiscible with the liquid film; and contacting the fluid and the liquid film to produce a liquid-fluid interface, wherein contacting the fluid over the porous liquid results in a mass transfer of the substance across the liquid-fluid interface. The liquid holds its liquid properties, allowing effective interaction with the working fluid.

Another aspect of the present disclosure provides a method of performing a liquid-based extraction, the method comprising: (1) contacting a porous liquid comprising a high surface area solid and a liquid film substantially coating or covering the high surface area solid (e.g., at least 30% of the surface or surface area of the high surface area solid is covered and it has a PI value of at least of 150 m$^{-1}$) and (2) a fluid that is immiscible with the liquid film such that a liquid-fluid interface is produced and includes at least one substance that is extracted or absorbed by the liquid film, wherein contacting the porous liquid and fluid results in the mass transfer of the substance across the liquid-fluid interface. The liquid holds its liquid properties, allowing effective interaction with the working fluid.

In some embodiments, the liquid film has a contact angle on the high surface area solid in the presence of the fluid that is less than about 15 degrees (e.g., less than about 10 degrees or about 0 degrees, or 0 degree).

In certain embodiments, the fluid is a gas.

In some embodiments, at least one of: (1) the fluid includes carbon dioxide (e.g., a flue gas, or a chemical or refinery gas); (2) the liquid film includes an amine (e.g., monoethanolamine, tetraethylenepentamine), potassium hydroxide, or both; or (3) a combination thereof. The liquid holds its liquid properties, allowing effective interaction with the working fluid.

In particular embodiments, at least one of: (1) the fluid comprises water (e.g., wet natural gas); (2) the liquid film includes glycol (e.g., triethylene glycol); or (3) combinations thereof.

In some embodiments, the fluid is a liquid.

In some embodiments, at least one of the fluid includes furfural, the liquid film includes toluene, the high surface area solid is made of polyethylene, or combinations thereof.

A further aspect of the present disclosure provides a method of performing an enzymatic reaction, the method comprising: providing a porous liquid enzyme comprising a high surface area solid and an infused or encapsulating liquid film substantially covering the higher surface area solid (e.g., at least 30% of the surface or surface area of the high surface area solid is covered; PI value of at least of 150 m$^{-1}$) and comprising an enzyme; and contacting a fluid that is immiscible with the liquid film such that a liquid-fluid interface is produced and includes at least one substrate for the enzyme of the liquid film, wherein contacting the fluid and the porous liquid enzyme results in at least one of the catalysis of the substrate, a mass transfer of the substrate across the liquid-fluid interface, or both.

An additional aspect of the present disclosure provides a method of performing an enzymatic reaction, the method comprising: contacting (1) a porous liquid enzyme comprising a high surface area solid and a liquid film substantially covering the higher surface area solid (e.g., at least 30%, at least 50%, at least 70%, or at least 90% of the surface or surface area of the high surface area solid is covered; PI value of at least of 150 m$^{-1}$) that includes an enzyme, and (2) a fluid that is immiscible with the liquid film such that a liquid-fluid interface is produced and includes at least one substrate for the enzyme of the liquid film, wherein contacting the fluid and the porous liquid enzyme results in at least one of the catalysis of the substrate, a mass transfer of the substrate across the liquid-fluid interface, or both.

In some embodiments, the liquid film has a contact angle on the high surface area solid in the presence of the working fluid that is less than about 15 degrees (e.g., less than about 10 degrees or about 0 degrees).

In some embodiments, the liquid film is an aqueous solution and the working fluid is an organic solution.

In certain embodiments, the enzyme is cytochrome c, the substrate is nickel octaethylporphyrin, and the high surface area solid is wool (e.g., glass wool and/or quartz wool).

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional aspects and embodiments are expressly included within the scope of the present disclosure. The publications and other materials used herein to illuminate the background of the disclosure, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present disclosure and, together with the description, serve to explain the principles of the disclosure. The drawings are only for the purpose of illustrating an embodiment of the disclosure and are not to be construed as limiting the disclosure. Further objects, features and advantages of the disclosure will become apparent from the following detailed description taken in conjunction with the accompanying figures showing illustrative embodiments of the disclosure, in which:

Each filament contains surface porosity that can hold liquid to produce a liquid impregnated surface.

FIG. 8 demonstrates that the TEG-containing porous liquid efficiently absorbs water from wet hydrocarbon gas.

DETAILED DESCRIPTION

Figure 1:
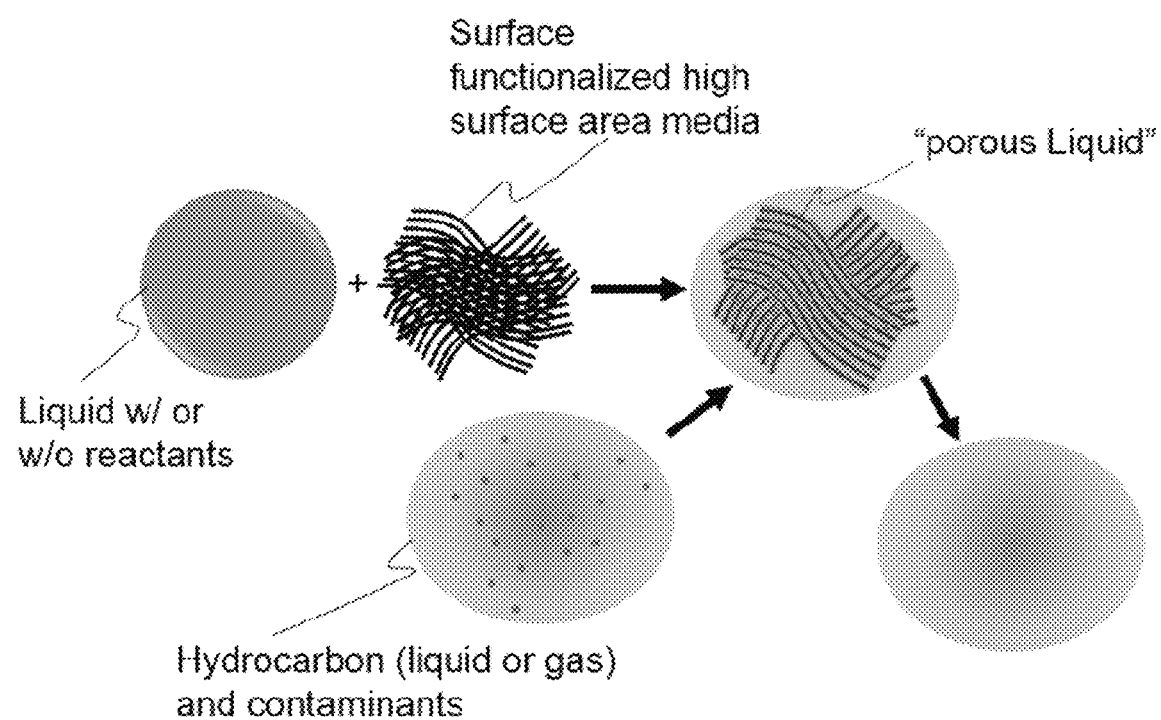
FIG. 1 illustrates the porous liquid or porous liquid enzyme of the present disclosure. The liquid holds its liquid properties, allowing effective interaction with the working fluid.

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures and other references mentioned herein are expressly incorporated by reference in their entirety.

The present disclosure is based on the surprising and unexpected ability to significantly increase the interfacial surface area of a liquid/fluid interface (i.e., the interfacial surface area between the liquid and the fluid or working fluid) of a liquid-based absorption or liquid-based extraction by covering a high surface area solid with the liquid by impregnating the liquid on to the surface of the solid where the liquid becomes in contact with the fluid (or working fluid) contacts. It was further discovered that a porous liquid enzyme could be prepared in a similar fashion, thereby immobilizing the enzyme in an easy, cost effective way that allows for all of the advantages of enzyme immobilization, while avoiding the significant number of disadvantages or problems of heretofore known immobilization methods (described in greater detail above).

Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

The following terms are used to describe the present disclosure. In instances where a term is not specifically defined herein, that term is given an art-recognized meaning by those of ordinary skill applying that term in context to its use in describing the present disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, in certain methods described herein that include more than one step or act, the order of the steps or acts of the method is not necessarily limited to the order in which the steps or acts of the method are recited unless the context indicates otherwise.

The term "porous liquid enzyme" as used herein, unless the context indicates otherwise, can describe a porous substrate having a high surface area and a liquid film covering as described herein, and further comprising one or more enzymes within the liquid film. For example, the porous liquid enzyme of the present disclosure may comprise a high surface area solid, and a liquid film substantially covering the high surface area solid (e.g., at least 30%, at least 50%, at least 70%, or at least 90% of the surface or surface area of the high surface area solid is covered by the infused liquid film and it has a PI value of at least of 150 m$^{-1}$), wherein the liquid film includes at least one enzyme or type of enzyme (e.g., 1, 2, 3, 4, 5, 6, 7, 8, 9, 10, or more enzymes).

The terms "coating" or "covering" as used herein, unless the context indicates otherwise, describes covering of the solids by an infused or encapsulating liquid. The solid surface is impregnated with liquid (infused or encapsulating liquid) by appropriate solid surface functionalization that includes chemical functionalization and in some cases textured/physical functionalization. In some instances, roughness of the surface acts as the intrinsic surface texture. The impregnating liquid is covering the solid surface and keeps its liquid nature. It is this liquid nature that can provide medium for separation, extraction, and enzyme immobilization. The liquid is able to infuse into the surface of the solids or encapsulate the entire solid surface because its chemistry allows the liquid to substantially spread onto the solid fully. The spreading is measured using the liquid contact angle on the solid. In cases that the working fluid is also a liquid, the contact angle is measured in the presence of the working liquid.

The present disclosure describes a porous liquid and a porous liquid enzyme and methods of using the same. In particular, the inventors surprisingly discovered that a porous liquid of the present disclosure is a cost effect and extremely efficiently method to absorb or extract a species or substance from a working fluid, and similarly, a porous liquid enzyme of the present disclosure is a cost effective and remarkably efficient method to catalyze a reaction with substrate in a working fluid. The porous liquid described herein does not rely on shear stress for moving liquid and thus can be used for liquid-liquid as well as liquid-gas systems. In addition, porous liquid does not have to form a stretched fiber geometry and thus can provide other geometries with higher surface contact area. Additionally, the porous liquid can also be utilized to immobilize enzymes for biological reactions.

An aspect of the present disclosure provides an article including a liquid-impregnated surface, which may be referred to as a porous liquid or porous liquid enzyme depending upon the substances included therein. A porous liquid and/or porous liquid enzyme may be based on the surface energy matching between a liquid film and a high surface area solid to form a stable liquid layer/film that is not readily removed from the surface of the high surface area solid. Thus, in any aspect or embodiment described herein, the liquid film stably covers the high surface area solid and/or contained within the rough and/or textured surface (e.g., a matrix of solid features, described below) regardless of orientation of the porous liquid or porous liquid enzyme, such as under normal shipping and/or handling conditions.

According to an aspect of the present disclosure the porous liquid or porous liquid enzyme (i.e., the article) comprises a high surface area solid, and a liquid film substantially coating or covering the high surface area solid (e.g., at least 30%, at least 40%, at least 50%, at least 60%, at least 70%, at least 80%, or at least 90% of the surface or surface area of the high surface area solid is covered by the impregnated liquid film). For example, the surface or surface area of the high surface area solid may be at least 30%, 35%, 40%, 45%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% coated by the liquid film. In certain aspect, the high surface area solid is made of a material that is not reactive with the liquid film.

O'Rilly et al. in Chemistry A European Journal 2007 teach what they call micro-porous (and porous) liquid. O'Rilly et al. generate their porous liquid by introducing a rigid cage-like molecule, such as cyano-bridged metallocubes, in a liquid solvent. The cage-like molecule is selected such that the opening of the cage is small enough that the solvent molecules cannot enter the cage, thus preserving the void within the cage. This approach is fundamentally different than what is described herein. Here, a high surface area liquid or a porous liquid is generated by infusing a liquid on a functionalized surface of a high surface area solid or encapsulating an entire solid surface of a high surface area solid. This approach allows for the direct contact of the liquid in the porous liquid with a working fluid for separation and/or reaction.

U.S. Pat. No. 6,402,818 B1 (Sengupta et al.) teaches the use of hollow fiber membrane contactors to allow for the mass transfer of dissolved gas in liquid across the membrane into a low pressure environment. The same membrane prevents mass transfer of liquid through the membrane due to high capillary forces. The planar geometry of the membrane forces a radial configuration for increasing surface area. In contrast to membrane contactors, the porous liquid of the present disclosure brings fluid and liquid in direct contact without any barrier. Furthermore, the porous liquid of the present disclosure can be formed not only into a planar geometry similar to membranes, but can include other shapes and geometries, such as fibers (including wool), pre-designed shapes in a 3D printed solid structure, etc. As a result, a significant increase in the amount of surface area, which is critical for effective mass transfer across the interface, can be achieved by the porous liquid of the present disclosure.

International Patent Application Publication No. WO2017055615 A1 (Deng et al.) teaches the use of a composite membrane to capture $CO_2$ from a mixed gaseous feed. The composite membrane allows $CO_2$ to mass transport across the membrane where it can be absorbed using a carbon dioxide capturing organic solvent. This approach is intrinsically different than that of the porous liquid of the present disclosure, where liquid absorbing $CO_2$ is in direct contact with gaseous feed. The high surface area of the liquid in the porous liquid of the present disclosure is produced by shaping the liquid film into a porous geometry. This is possible through the use of a textured and/or rough functionalized solid surface (or high surface area solid) that holds the liquid film in place.

Trays and sheets of liquid-liquid contactors have also been used in mixing towers. For example, U.S. Pat. No. 5,393,429 (Nakayama et al.) teaches the use of non-agitation countercurrent flow in liquid-liquid contactors. They utilize splitter plates and slits, as well as holes to mix two (heavy and light) liquids. The tray contactors are made in such a manner that the counter flow of the two liquids forces them to generate the interfacial area needed for mass transfer across the interface. In order to generate a sufficiently high contact area, however, a large volume tower is required for tray and sheet contractor. In contrast, the porous liquid of the present disclosure utilizes a stationary layer of liquid formed in a high surface area geometry (i.e., the liquid film) to produce a high surface contact area in a much smaller volume.

U.S. Pat. No. 3,758,404 (Clonts et al.) uses fiber film contactors where a bundle of fibers stretched from upstream to downstream of an extractor. In this approach, one liquid preferentially wets the fibers and the second liquid, that normally contains contaminants, flows over the first liquid. The mass transfer of contaminants across the interface occurs during the flow. Because of the shear stress at the interface of the two liquids, the second liquid pulls the first liquid from upstream to downstream into a collection vessel for separation and regeneration. The existence of a shear stress is critical for this approach, and thus fiber film contactors cannot be applied to a liquid-gas system. In addition, in this approach fibers must be stretched from upstream to downstream to allow flow of the liquid into the collecting vessels. In contrast, the porous liquid described herein does not rely on shear stress for moving liquid and thus can be used for both liquid-liquid systems and liquid-gas systems.

Bilek et al. (Plasma modified surfaces for covalent immobilization of functional biomolecules in the absence of chemical linkers: towards better biosensors and a new generation of medical implants. Biophysical Reviews 2010, 2:55-65) and Kawakami et al. (Immobilization of glucose oxidase on polymer membranes treated by low-temperature plasma. Biotechnology and Bioengineering 1988, 32:369-373) teach the modification of material surfaces by plasma for immobilizing enzymes covalently with or without a chemical spacer. However, no work has been done immobilizing a thin layer of enzyme solution on surfaces, such as plasma treated surfaces. Another aspect of the present disclosure involves the immobilization of enzyme solution using a porous liquid, which can be utilized to efficiently catalyze reactions in which substrate is found within the working fluid.

U.S. Pat. No. 8,574,704 B2 (Smit et al.) uses an impregnated surface to generate a liquid layer on top of the surface for protecting the surface against fouling, ice formation, scale formation, and/or hydrate formation. It teaches producing a non-wetting surface that reduces or eliminates contact and interaction with the other fluid and liquid. It teaches that these non-wetting surfaces protect the solid from a harsh environment. This is in stark contrast with the current disclosure of a porous liquid which liquid impregnated surfaces were used not to reduce, but to increase, the contact between the liquid and the working fluid for enhanced separation and reaction. The solid substrate, when appropriately prepared and having high apparent surface area, is used to hold the liquid and to provide a high surface area liquid. This, in turn, enhances, not reduces, interfacial area between the liquid and working fluid. In addition, the porous liquid is not to protect the solid surfaces but to utilize solid surfaces to produce a useful high surface area liquid that can enhance separation and reaction without the need of rigorous mixing.

The article, "Liquid-Liquid Equilibria for Extraction of Furfural From Aqueous Solution Using Different Solvents," (Kun Xin et al., Fluid Phase Equilibria, volume 425, pg. 393, 2016) teaches that a liquid toluene extraction is effective for separation of furfural from an aqueous solution. The authors utilized liquid-liquid extraction where an aqueous solution of furfural was mixed rigorously with toluene. Rigorous mixing, of course, is necessary to generate enough interfacial area between the two liquids for a better mass transport of furfural to toluene. In addition, after mass transport, the mixture was kept untouched for a substantial amount of time so that toluene and water could phase separate for final separation of the organic phase from the aqueous phase. This is in contrast with the current disclosure, where toluene was impregnating onto and kept on a polypropylene wool to generate a porous liquid toluene. The porous liquid toluene intrinsically possesses a high surface area liquid, therefore it can produce high interfacial area between toluene and the aqueous solution of furfural. This, in turn, provides the needed mass transport of furfural from the aqueous solution to toluene without any rigorous mixing. Our disclosure also does not require any settling and phase separation of toluene and the aqueous solution.

The article, "Preparation and Characterization of Novel CO2 'Molecular Basket' Adsorbents Based on Polymer-Modified Mesoporous Molecular Sieve MCM-41," (Xiaochun Xu et al., Microporous and Mesoporous Materials, volume 62, issues 1-2, pgs. 29-45, 2003), and the article, "Capture of Carbon Dioxide From Flue Gas on TEPA-Grafted Metal-Organic Framework Mg2(dobdc)," (Yan Cao et al., Journal of Environmental Sciences, volume 25, issue 10, pg. 2081, 2013) teach how to craft an amine polymer or TEPA (tetraethylenepe) in the pores of mesoporous powder materials such as zeolite MCM-41 and a metal-organic framework. The article, "Designing Adsorbents for CO2 Capture From Flue Gas-Hyperbranced Aminosilicas Capable of Capturing CO2 Reversibly," (Jason Hicks et al., Journal of American Chemical Society, volume 130, pg. 2902, 2008) teaches how to covalently bond amine molecules on solid surfaces to generate a nanoscale coating of amine for CO2 separation. These contrast with the current disclosure where a solid surface with high apparent surface area was modified and then impregnated with a liquid. The liquid holds its natural liquid properties, as demonstrated in the examples in this disclosure, and can directly be in contact with the working fluid for effective separation and reaction.

The article, "Adsorption of Carbon Dioxide on Monoethanolamine (MEA)-Impregnated Kenaf Core Fiber by Pressure Swing Adsorption System," (Nabilah Zaini et al., Jurnal Teknologi, volume 68, number 5, pg. 11, 2014) teaches of impregnating of 300 micron chips of kenaf fiber by wetting the chips with a solution of MEA in methanol and then evaporating methanol. The MEA coats the internal surface of the fiber chips and helps to adsorb CO2 reaching to capacity of 0.009 g of CO2/g of MEA. The results fit well with the Langmuir and Freundlich isotherms indicating surface adsorption. This is also in stark contrast with the current disclosure where liquid amine is impregnating the surface of solid structures with high apparent (excluding roughness) surface area such as quartz wool. Porous liquid preserves liquid properties for an effective separation. The liquid nature of a porous liquid provides absorption, not adsorption which is a surface effect. Absorption offers availability of every molecule in the liquid (not just the molecule on the surface, like adsorption) for effective separation. Porous liquid MEA, as noted in the examples of this disclosure, through absorption are able to remove 0.361 g of CO2 per gram of MEA, which is 40× greater than the noted prior art.

High Surface Area Solid

Figure 2A:
FIGS. 2A and 2B are exemplary scanning electron micrographs of quartz wool fibers, which may be utilized to as the high surface area solid, in the preparation of a porous liquid or a porous liquid enzyme of the present disclosure.
Figure 2B:
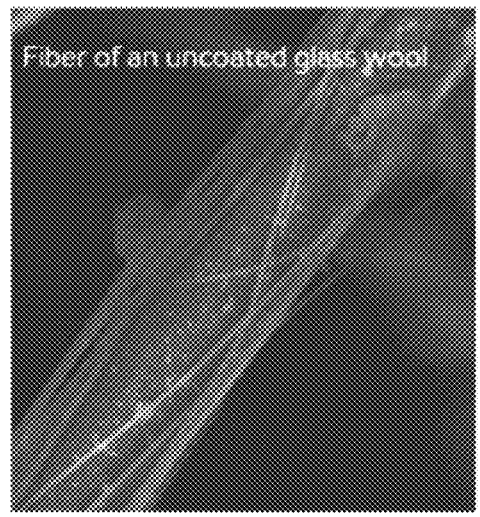
Figure 3A:
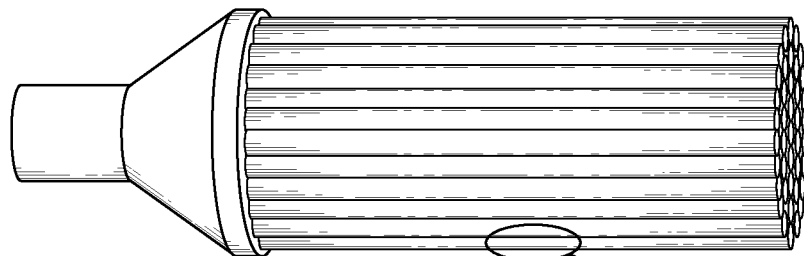
FIG. 3A shows an exemplary image of a 3D printed solid structure, which can be utilized as the high surface area solid, in the preparation of a porous liquid or a porous liquid enzyme of the present disclosure. This structure contains 69 straight metallic filaments, each with a diameter of about 800 um and length of 25 mm, resulting in S/V=1487 m$^{-1}$.

In some embodiments, design of the porous liquid or porous liquid enzyme is based on the liquid of the liquid film being able to encapsulate or infuse into, wet, and stably cover the surface of the high surface area solid (e.g., the rough, porous, roughened, and/or textured surface of the high surface area solid) and the liquid film being immiscible in the fluid that the porous liquid or porous liquid enzyme comes into contact with. The liquid film can encapsulate or infuse into, wet, and stably cover the high surface area solid if the solid has sufficient surface roughness, large surface area, and physical and/or chemical affinity (e.g., the high surface area solid may be activated prior to the application of the liquid film) for the liquid film. The degree of roughness and/or texture required to stably cover the high surface area solid will depend on the formulation of the liquid film and the chemical make of the surface of the high surface area solid. For example, as shown in FIGS. 2A and 2B, as well as the examples below, wools/fibers (such as quartz wool/fiber, polyethylene wool/fiber, etc.) have a roughness and physical structure that is sufficient for use as a high surface area solid in certain embodiments of the present disclosure. Also for example, 3D printed structures, similar to what is shown in FIG. 3A, have a roughness that is sufficient to hold liquid. This also can be used as a high surface area solid in certain embodiments of the present disclosure.

One skilled in the art, having read the present disclosure, however, would be able to determine the level of roughness/texture required for a particular liquid film through routine experimentation, coupled with general common knowledge for those skilled in the art. See, e.g., U.S. Patent Application Publication No. 2015/0196940 A1, U.S. Patent Application Publication No. 2017/0144828 A1, and U.S. Pat. No. 9,585,757 B2, each of which are incorporated herein by reference in their entirety. For example, the roughness surface of the high surface area solid (whether it is rough, porous, or textured by nature and/or subsequently roughened and/or textured), R, defined as the ratio between the actual and projected/protruded and/or indented/depressed areas of the surface, may be any value greater than 1 (as 1 represents a flat surface). For example, the roughness of the surface is at least 1.01, at least 1.1, at least 1.2, at least 1.3, at least 1.4, at least 1.5, at least 1.6, at least 1.7, at least 1.8, at least 1.9, at least 2, at least 2.25, at least 2.5, at least 2.75, at least 3, at least 3.5, at least 4, at least 4.5, at least 5, or more.

Figure 5:
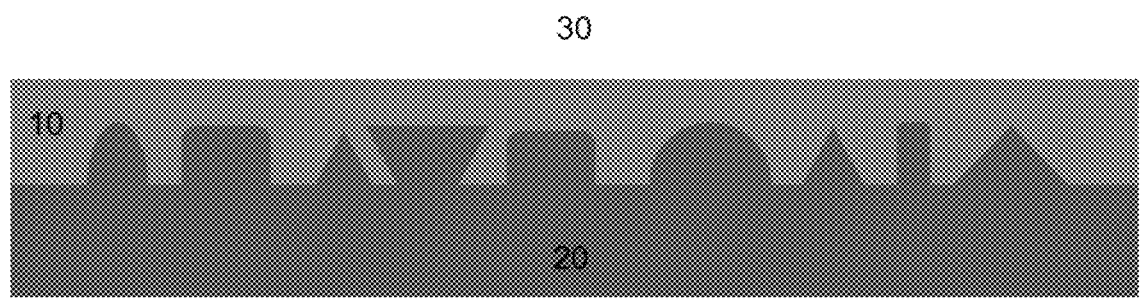
FIG. 5 shows schematic diagrams of an exemplary porous liquid and porous liquid enzyme of the present disclosure. As shown by FIG. 5, the porous liquid or porous liquid enzyme includes a liquid film (10) that substantially covers the high surface area solid (20). The working fluid (30) is in contact with the liquid (10). The space located between the textured features may include the liquid film (10), a gas, or a combination thereof. The shape of the textured features may vary. Liquid film in this schematic diagram has encapsulated the solid surface. When the level of liquid film 10 is below the height of the textures, the figure represents a liquid infused surface.

In certain aspects, the high surface area solid includes at least one of a rough surface, a textured surface, or both. Thus, a high surface area solid may be prepared with a surface that has a matrix of solid features or a rough surface. The matrix of solid features may include microstructures and/or nanostructures that protrude or extend from the surface of the high surface area solid. The texture (e.g., the micro-structures and/or nano-structures) may be applied to the surface of the high surface area solid. As shown by FIG. 5, the porous liquid or porous liquid enzyme includes a liquid film (10) that substantially covers the surface area of the solid (20). The liquid may be found between the features of the solid surface (20) or encapsulate the entire surface. FIG. 5 is only illustrative of the concepts of the present disclosure. One skilled in the art appreciates that modifications to the porous liquid or porous liquid enzyme of the present disclosure are contemplated and within the scope of the present disclosure The solid features (e.g., micro-structures and/or nano-structures) may have an average characteristic dimension (i.e., length for roughly rod-shaped objects, thickness, depth, height, or combinations thereof) of about 0.1 µm to about 1000 µm (e.g., about 1 µm to about 200 µm or about 10 µm to about 50 µm). For example, the average characteristic dimension of the solid features may be about 0.1 µm to about 1000 µm, about 0.1 µm to about 900 µm, about 0.1 µm to about 800 µm, about 0.1 µm to about 700 µm, about 0.1 µm to about 600 µm, about 0.1 µm to about 500 µm, about 0.1 µm to about 400 µm, about 0.1 µm to about 300 µm, about 0.1 µm to about 200 µm, about 0.1 µm to about 100 µm, about 0.1 µm to about 50 µm, about 25 µm to about 1000 µm, about 25 µm to about 900 µm, about 25 µm to about 800 µm, about 25 µm to about 700 µm, about 25 µm to about 600 µm, about 25 µm to about 500 µm, about 25 µm to about 400 µm, about 25 µm to about 300 µm, about 25 µm to about 200 µm, about 25 µm to about 100 µm, about 75 µm to about 1000 µm, about 75 µm to about 900 µm, about 75 µm to about 800 µm, about 75 µm to about 700 µm, about 75 µm to about 600 µm, about 75 µm to about 500 µm, about 75 µm to about 400 µm, about 75 µm to about 300 µm, about 75 µm to about 200 µm, about 150 µm to about 1000 µm, about 150 µm to about 900 µm, about 150 µm to about 800 µm, about 150 µm to about 700 µm, about 150 µm to about 600 µm, about 150 µm to about 500 µm, about 150 µm to about 400 µm, about 150 µm to about 300 µm, about 300 µm to about 1000 µm, about 300 µm to about 900 µm, about 300 µm to about 800 µm, about 300 µm to about 700 µm, about 300 µm to about 600 µm, about 300 µm to about 500 µm, about 300 µm to about 400 µm, about 400 µm to about 1000 µm, about 400 µm to about 900 µm, about 400 µm to about 800 µm, about 400 µm to about 700 µm, about 400 µm to about 600 µm, about 400 µm to about 500 µm, about 500 µm to about 1000 µm, about 500 µm to about 900 µm, about 500 µm to about 800 µm, about 500 µm to about 700 µm, about 500 µm to about 600 µm, about 600 µm to about 1000 µm, about 600 µm to about 900 µm, about 600 µm to about 800 µm, about 600 µm to about 700 µm, about 700 µm to about 1000 µm, about 700 µm to about 900 µm, about 700 µm to about 800 µm, about 800 µm to about 1000 µm, about 800 µm to about 900 µm, or about 900 µm to about 1000 µm. In any aspect or embodiment described herein, the solid features (e.g., micro-structures and/or nano-structures) are arranged with average spacing of about 0.1 µm to about 500 µm (e.g., about 5 µm to about 200 µm or about 10 µm to about 30 µm) between adjacent solid features. For example, the average space between solid features may be about 0.1 µm to about 500 µm, about 0.1 µm to about 500 µm, about 0.1 µm to about 450 µm, about 0.1 µm to about 400 µm, about 0.1 µm to about 350 µm, about 0.1 µm to about 300 µm, about 0.1 µm to about 250 µm, about 0.1 µm to about 200 µm, about 0.1 µm to about 150 µm, about 0.1 µm to about 100 µm, about 0.1 µm to about 50 µm, about 0.1 µm to about 30 µm, about 1 µm to about 500 µm, about 1 µm to about 450 µm, about 1 µm to about 400 µm, about 1 µm to about 350 µm, about 1 µm to about 300 µm, about 1 µm to about 250 µm, about 1 µm to about 200 µm, about 1 µm to about 150 µm, about 1 µm to about 100 µm, about 1 µm to about 50 µm, about 1 µm to about 30 µm, about 5 µm to about 500 µm, about 5 µm to about 450 µm, about 5 µm to about 400 µm, about 5 µm to about 350 µm, about 5 µm to about 300 µm, about 5 µm to about 250 µm, about 5 µm to about 200 µm, about 5 µm to about 150 µm, about 5 µm to about 100 µm, about 5 µm to about 50 µm, about 5 µm to about 30 µm, about 10 µm to about 500 µm, about 10 µm to about 450 µm, about 10 µm to about 400 µm, about 10 µm to about 350 µm, about 10 µm to about 300 µm, about 10 µm to about 250 µm, about 10 µm to about 200 µm, about 10 µm to about 150 µm, about 10 µm to about 100 µm, about 10 µm to about 50 µm, about 25 µm to about 500 µm, about 25 µm to about 450 µm, about 25 µm to about 400 µm, about 25 µm to about 350 µm, about 25 µm to about 300 µm, about 25 µm to about 250 µm, about 25 µm to about 200 µm, about 25 µm to about 150 µm, about 50 µm to about 500 µm, about 50 µm to about 450 µm, about 50 µm to about 400 µm, about 50 µm to about 350 µm, about 50 µm to about 300 µm, about 50 µm to about 250 µm, about 50 µm to about 200 µm, about 50 µm to about 150 µm, about 50 µm to about 100 µm, about 100 µm to about 500 µm, about 100 µm to about 450 µm, about 100 µm to about 400 µm, about 100 µm to about 350 µm, about 100 µm to about 300 µm, about 100 µm to about 250 µm, about 100 µm to about 200 µm, about 100 µm to about 150 µm, about 150 µm to about 500 µm, about 150 µm to about 450 µm, about 150 µm to about 400 µm, about 150 µm to about 350 µm, about 150 µm to about 300 µm, about 150 µm to about 250 µm, about 150 µm to about 200 µm, about 200 µm to about 500 µm, about 200 µm to about 450 µm, about 200 µm to about 400 µm, about 200 µm to about 350 µm, about 200 µm to about 300 µm, about 200 µm to about 250 µm, about 250 µm to about 500 µm, about 250 µm to about 450 µm, about 250 µm to about 400 µm, about 250 µm to about 350 µm, about 250 µm to about 300 µm, about 300 µm to about 500 µm, about 300 µm to about 450 µm, about 300 µm to about 400 µm, about 300 µm to about 350 µm, about 350 µm to about 500 µm, about 350 µm to about 450 µm, about 350 µm to about 400 µm, about 400 µm to about 500 µm, or about 450 µm to about 500 µm.

In some embodiments, the solid features are rough. For example, the solid features of the high surface area solid can have an average surface roughness R of 1.1 to about 10.

The texture or roughness may be imparted through extrusion, electrospinning, blow-molding of a mixture of materials (e.g., glass, polyethylene, a continuous polymer blend, or mixture of a polymer and particles), or additive manufacturing such as 3D printing laser metal deposition. One of the materials may be subsequently dissolved, etched, melted, or evaporated away, leaving a textured, and/or rough surface behind. The texture or roughness may be imparted by mechanical roughening (e.g., tumbling with an abrasive), spray-coating or polymer spinning, deposition of particles from solution (e.g., layer-by-layer deposition, evaporating away liquid from a suspension of liquid and particles), and/or additive manufacturing such as 3D printing laser metal deposition. Other possible methods for imparting the texture or roughness include: deposition of a polymer from a solution (e.g., the polymer forms a rough, porous, or textured surface behind); extrusion or blow-molding of a material that expands upon cooling, leaving a wrinkled surface (e.g., wool, including glass wool, polyethylene wool, quartz wool, and other fibers); and application of a layer of a material onto a surface that is under tension or compression, and subsequently relaxing the tension or compression of surface beneath, resulting in a textured surface.

In any embodiment herein, the surface of the high surface area solid may be roughened.

In embodiment herein, the area of the high surface area solid is the apparent surface area, defined as the total geometric area if there were no texture or roughness on the surface. For example the apparent surface area of each filament in the exemplary 3D structure in FIG. 3 is the surface area of a smooth filament. The apparent surface area of the exemplary 3D structure in FIG. 3 is thus the sum of the apparent surface area of each filament plus the area of the smooth base of the structure. In any aspect or embodiment described herein, the surface area of the high surface area solid is greater than about 0.001 $m^2/g$, great than about 0.01 $m^2/g$, great than about 0.1 $m^2/g$, or great than about 0.2 $m^2/g$. For example, the high surface area solid has a surface area of about 0.001 $m^2/g$ to 45 $m^2/g$, about 0.001 $m^2/g$ to 40 $m^2/g$, about 0.001 $m^2/g$ to 35 $m^2/g$, about 0.001 $m^2/g$ to 30 $m^2/g$, about 0.001 $m^2/g$ to 25 $m^2/g$, about 0.001 $m^2/g$ to 20 $m^2/g$, about 0.001 $m^2/g$ to 15 $m^2/g$, about 0.001 $m^2/g$ to 10 $m^2/g$, about 0.001 $m^2/g$ to 5 $m^2/g$, about 0.001 $m^2/g$ to 1.0 $m^2/g$, about 0.01 $m^2/g$ to 45 $m^2/g$, about 0.01 $m^2/g$ to 40 $m^2/g$, about 0.01 $m^2/g$ to 35 $m^2/g$, about 0.01 $m^2/g$ to 30 $m^2/g$, about 0.01 $m^2/g$ to 25 $m^2/g$, about 0.01 $m^2/g$ to 20 $m^2/g$, about 0.01 $m^2/g$ to 15 $m^2/g$, about 0.01 $m^2/g$ to 10 $m^2/g$, about 0.01 $m^2/g$ to 5 $m^2/g$, about 0.01 $m^2/g$ to 1.0 $m^2/g$, about 0.1 $m^2/g$ to about 45 $m^2/g$, about 0.1 $m^2/g$ to about 40 $m^2/g$, about 0.1 $m^2/g$ to about 35 $m^2/g$, about 0.1 $m^2/g$ to about 30 $m^2/g$, about 0.1 $m^2/g$ to about 25 $m^2/g$, about 0.1 $m^2/g$ to about 20 $m^2/g$, about 0.1 $m^2/g$ to about 15 $m^2/g$, about 0.1 $m^2/g$ to about 10 $m^2/g$, about 0.2 $m^2/g$ to about 45 $m^2/g$, about 0.2 $m^2/g$ to about 40 $m^2/g$, about 0.2 $m^2/g$ to about 35 $m^2/g$, about 0.2 $m^2/g$ to about 30 $m^2/g$, about 0.2 $m^2/g$ to about 25 $m^2/g$, about 0.2 $m^2/g$ to about 20 $m^2/g$, about 0.2 $m^2/g$ to about 15 $m^2/g$, about 0.2 $m^2/g$ to about 10 $m^2/g$, about 0.5 $m^2/g$ to about 45 $m^2/g$, about 0.5 $m^2/g$ to about 40 $m^2/g$, about 0.5 $m^2/g$ to about 35 $m^2/g$, about 0.5 $m^2/g$ to about 30 $m^2/g$, about 0.5 $m^2/g$ to about 25 $m^2/g$, about 0.5 $m^2/g$ to about 20 $m^2/g$, about 0.5 $m^2/g$ to about 15 $m^2/g$, about 0.5 $m^2/g$ to about 10 $m^2/g$, about 5 $m^2/g$ to about 45 $m^2/g$, about 5 $m^2/g$ to about 40 $m^2/g$, about 5 $m^2/g$ to about 35 $m^2/g$, about 5 $m^2/g$ to about 30 $m^2/g$, about 5 $m^2/g$ to about 25 $m^2/g$, about 5 $m^2/g$ to about 20 $m^2/g$, about 5 $m^2/g$ to about 15 $m^2/g$, about 10 $m^2/g$ to about 45 $m^2/g$, about 10 $m^2/g$ to about 40 $m^2/g$, about 10 $m^2/g$ to about 35 $m^2/g$, about 10 $m^2/g$ to about 30 $m^2/g$, about 10 $m^2/g$ to about 25 $m^2/g$, about 10 $m^2/g$ to about 20 $m^2/g$, about 15 $m^2/g$ to about 45 $m^2/g$, about 15 $m^2/g$ to about 40 $m^2/g$, about 15 $m^2/g$ to about 35 $m^2/g$, about 15 $m^2/g$ to about 30 $m^2/g$, about 15 $m^2/g$ to about 25 $m^2/g$, about 20 $m^2/g$ to about 45 $m^2/g$, about 20 $m^2/g$ to about 40 $m^2/g$, about 20 $m^2/g$ to about 35 $m^2/g$, about 20 $m^2/g$ to about 30 $m^2/g$, about 25 $m^2/g$ to about 45 $m^2/g$, about 25 $m^2/g$ to about 40 $m^2/g$, about 25 $m^2/g$ to about 35 $m^2/g$, about 30 $m^2/g$ to about 45 $m^2/g$, about 30 $m^2/g$ to about 40 $m^2/g$, or about 35 $m^2/g$ to about 40 $m^2/g$.

Liquid Film

In certain embodiments, the liquid film as described herein is formulated to extract at least one species or substance from a fluid or working fluid. Thus, in any aspect or embodiment described herein, the working fluid and the liquid film are immiscible. Thus, the liquid film and working fluid are selected such that a contaminant(s) from the working fluid is extracted from and/or absorbed by the liquid film (e.g., by mass transfer) and the working fluid and liquid film are immiscible.

For example, the liquid film can include at least one of an amine, monoethanolamine, tetraethylenepentamine, an alkali metal hydroxide (e.g., potassium hydroxide, sodium hydroxide, lithium hydroxide, rubidium hydroxide, cesium hydroxide, or combinations thereof), potassium hydroxide, sodium hydroxide, lithium hydroxide, or combinations thereof; a porous liquid with one of the aforementioned compounds may be used to extract carbon dioxide from a gaseous mixture (such as flue gas, or a chemical or refinery gas). By way of further example, the liquid film could include glycol, triethylene glycol, or combination thereof; a porous liquid with the aforementioned compounds may be used to extract water from a wet natural gas.

In any aspect or embodiment described herein, the liquid film has a thickness from the bottom of the roughness or the texture to the top surface of the liquid film no greater than 1400 μm (e.g. a thickness no greater than 1000 μm, about 10 μm to about 1000 μm, or about 10 μm to about 100 μm). For example, in any aspect or embodiment described herein, the thickness of the liquid film on substantially covering the high surface area solid is ≤1400 μm, ≤1300 μm, ≤1200 μm, ≤1100 μm, ≤1000 μm, ≤900 μm, ≤800 μm, ≤700 μm, ≤600 μm, ≤500 μm, ≤400 μm, ≤300 μm, ≤200 μm, ≤100 μm, about 10 μm to about 1400 μm, about 10 μm to about 1200 μm, about 10 μm to about 1000 μm, about 10 μm to about 800 μm, about 10 μm to about 900 μm, about 10 μm to about 700 μm, about 10 μm to about 600 μm, about 10 μm to about 500 μm, about 10 μm to about 400 μm, about 10 μm to about 300 μm, about 10 μm to about 200 μm, about 10 μm to about 100 μm, about 100 μm to about 1400 μm, about 100 μm to about 1200 μm, about 100 μm to about 1000 μm, about 100 μm to about 800 μm, about 100 μm to about 900 μm, about 100 μm to about 700 μm, about 100 μm to about 600 μm, about 100 μm to about 500 μm, about 100 μm to about 400 μm, about 100 μm to about 300 μm, about 100 μm to about 200 μm, about 250 μm to about 1400 μm, about 250 μm to about 1200 μm, about 250 μm to about 1000 μm, about 250 μm to about 800 μm, about 250 μm to about 900 μm, about 250 μm to about 700 μm, about 250 μm to about 600 μm, about 250 μm to about 500 μm, about 500 μm to about 1400 μm, about 500 μm to about 1200 μm, about 500 μm to about 1000 μm, about 500 μm to about 800 μm, about 500 μm to about 900 μm, about 500 μm to about 700 μm, about 750 μm to about 1400 μm, about 750 μm to about 1200 μm, about 750 μm to about 1000 μm, about 100 μm to about 1400 μm, about 1000 μm to about 1200 μm, or about 1200 μm to about 1400 μm.

In other embodiments, the liquid film is formulated to prepare a porous liquid enzyme. The liquid film of the porous liquid enzyme comprises at least one enzyme or type of enzyme (e.g., 1, 2, 3, 4, 5 or more enzymes). When the porous liquid enzyme is placed in contact with a working fluid that contains substrate for the enzyme of the liquid film, the enzyme catalyzes a biological reaction that converts the substrate of the working fluid. For example, the oxidation of nickel octaethylprophyrin can be accomplished by contacting a working fluid having nickel octaethylprophyrin therein with a porous liquid enzyme that has cytochrome c in the liquid film, which is immiscible in the working fluid. As demonstrated by the Examples below, the porous liquid enzyme of the present disclosure provides a cost effective enzyme immobilization technique that does not require complicated immobilization steps or toxic agents, and provides an extremely efficient system for enzymatic reactions despite the liquid film and working fluid not mixing.

Method of Performing a Liquid-Based Extraction

A further aspect of the present disclosure provides a method of performing a liquid-based extraction. In certain embodiments, the method comprises: providing a porous liquid comprising a high surface area solid and a liquid film substantially covering the high surface area solid (e.g., at least 30%, 40%, 50%, 60%, 70%, 80%, or 90% of the surface or surface area of the high surface area solid is covered by the infused or encapsulating liquid film and having a PI of at least of 150 m$^{-1}$) that is formulated to extract or absorb at least one species or substance from a fluid that is immiscible with the liquid film; and contacting the fluid and the liquid film to produce a liquid-fluid interface, wherein contacting the fluid over the porous liquid results in a mass transfer of the species or substance across the liquid-fluid interface.

In some embodiments, the method comprises: (1) contacting a porous liquid comprising a high surface area solid and a liquid film substantially covering the high surface area solid (e.g., at least 30%, 40%, 50%, 60%, 70%, 80%, or 90% of the surface or surface area of the high surface area solid is covered by an infused or encapsulating liquid film and/or having a PI of at least of 150 m$^{-1}$) and (2) a fluid that is immiscible with the liquid film such that a liquid-fluid interface is produced and includes at least one species or substance that is extracted or absorbed by the liquid film, wherein contacting the porous liquid and the fluid results in the mass transfer of the species or substance across the liquid-fluid interface.

In any aspect or embodiment described herein, the porous liquid utilized by the method of the present disclosure may be any porous liquid described herein.

In some embodiments, the liquid film has a contact angle on the high surface area solid in the presence of the fluid that is zero. In certain embodiments, the fluid is a gas.

In yet other embodiments, at least one of: (1) the fluid includes carbon dioxide (such as a flue gas, or a chemical or refinery gas); (2) the liquid film includes an amine e.g., monoethanolamine, tetraethylenepentamine), potassium hydroxide, or both; or (3) a combination thereof. In particular embodiments, at least one of: (1) the fluid includes water (such as wet natural gas); (2) the liquid film includes glycol (e.g., triethylene glycol); or (3) combinations thereof. In other embodiments, the fluid is a liquid.

In another embodiment, at least one of the fluid includes furfural, the liquid film includes toluene, the high surface area solid is made of polyethylene, or combinations thereof.

Method of Performing an Enzymatic Reaction

A further aspect of the present disclosure provides a method of performing an enzymatic reaction. In certain embodiments, the method comprises: providing a porous liquid enzyme comprising a high surface area solid and a liquid film substantially covering the higher surface area solid (e.g., at least 30, 40, 50, 60, 70, 80, or 90% of the surface or surface area of the high surface area solid is covered by the infused liquid film and having a PI of at least of 150 m$^{-1}$) and comprising an enzyme; and contacting a fluid that is immiscible with the liquid film such that a liquid-fluid interface is produced and includes at least one substrate for the enzyme of the liquid film, wherein contacting the fluid and the porous liquid enzyme results in at least one of the catalysis of the substrate, a mass transfer of the substrate across the liquid-fluid interface, or both.

In other embodiments, the method comprises contacting (1) a porous liquid enzyme comprising a high surface area solid and a liquid film substantially covering the higher surface area solid (e.g., at least 30% of the surface or surface area of the high surface area solid is coated) that includes an enzyme, and (2) a fluid that is immiscible with the liquid film such that a liquid-fluid interface is produced and includes at least one substrate for the enzyme of the liquid film, wherein contacting the fluid and the porous liquid enzyme results in at least one of the catalysis of the substrate, a mass transfer of the substrate across the liquid-fluid interface, or both.

In any aspect or embodiment described herein, the porous liquid utilized by the method of the present disclosure may be any porous liquid described herein.

In some embodiments, the liquid film has a contact angle on the high surface area solid materials in the presence of the working fluid that is less than about 15 degrees. For example, in certain embodiments, the contact angle of the liquid film on the high surface area solid in the presence of the fluid is less than about 14 degrees, less than about 13 degrees, less than about 12 degrees, less than about 11 degrees, less than about 10 degrees, less than about 9 degrees, less than about 8 degrees, less than about 7 degrees, less than about 6 degrees, less than about 5 degrees, less than about 4 degrees, less than about 3 degrees, less than about 2 degrees, less than about 1 degree, or about 0 degrees, or 0 degrees.

In other embodiments, the liquid film is an aqueous solution and the working fluid is an organic solution.

In certain embodiments, the enzyme is cytochrome c, the substrate is nickel octaethylporphyrin, and the high surface area solid is wool (e.g., glass wool and/or quartz wool).

EXAMPLES

Example 1. Quartz Wool

Quartz wool surface structure was examined using Scanning Electron Microscopy (SEM). FIGS. 2A and 2B shows a typical micrograph of quartz wool fibers. The natural roughness of the quartz wool fiber, as shown in FIGS. 2A and 2B, along with the surface chemistry keeps the desirable liquid on the surfaces of the quartz wool.

Example 2. Porous Liquid Oil Using 3D Printed Structure

Figure 3B:
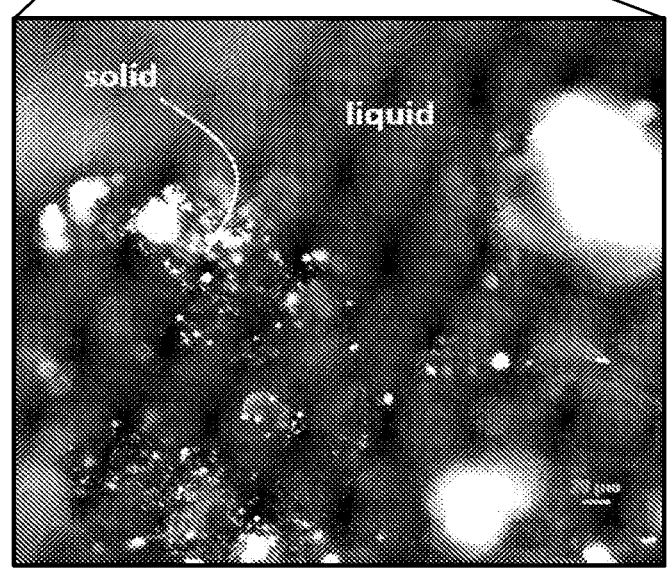
FIG. 3B shows an optical micrograph of the surface of one of the filaments that is holding liquid within its roughness.

FIG. 3A shows an exemplary 3D printed structure of a high surface area solid surface. It consist of 69 filaments with surface-to-surface distance of 500 microns mounted on a perforated disc having a diameter of 12 mm, with S/V=1487 m$^{-1}$. In this example, the diameter and length of each filament is about 800 microns and 25 mm, respectively. The structure was printed using additive manufacturing laser metal deposition of aluminum oxide. The 3D printed structure was cleaned with acetone, then ethanol, and then heptane before being dried using nitrogen gas. The solvent cleaned 3D structure was then left in a plasma cleaner for 5 minutes. Plasma radiation oxidizes the surface to substantially increase the surface energy of the 3D structure. This surface chemical modification allows liquid to cover a larger area of the surface. After plasma cleaning, the 3D structure was introduced to 200 mg of poly-alpha-olefin 2 cSt (PAO2) oil. FIG. 3B is an optical micrograph of liquid oil (PAO2) within the roughness of the structure. FIG. 3B demonstrates the porous liquid is indeed holding liquid within the roughness of its surface.

Figure 3C:
FIG. 3C shows another image of the 3D printed solid structure. The 800 um diameter filaments are mounted with a surface-to-surface distance of 500 microns in a tube of 1.1 cm inner diameter and approximate length of 8 cm, resulting in S/V=1487 $m^{-1}$. The structure and the tube surrounding the structure all were printed using additive manufacturing with laser metal deposition of aluminum oxide.

FIG. 3C shows an exemplary 3D printed structure of a high surface area solid surface. It has filaments of 800 microns diameter mounted with surface-to-surface distance of 500 microns in a tube of 1.1 cm inner diameter and approximate length of 8 cm, with S/V=1487 m$^{-1}$. The structure and the tube surrounding the structure were printed using additive manufacturing with laser metal deposition of aluminum oxide.

Figure 4:
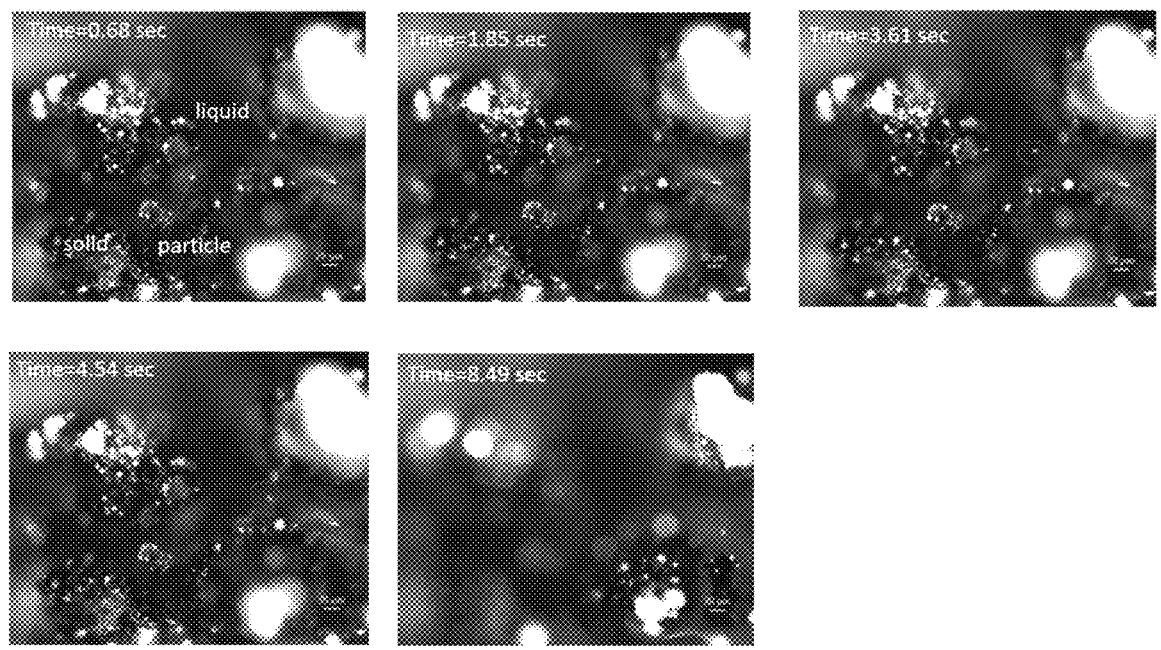
FIG. 4 shows time lapse images of a flowing liquid within the roughness of each filament of the 3D printed structure of FIG. 3A. To illustrate the fluidic nature of the infused liquid a particle was placed in the liquid and its flow in the liquid was followed in time. The images clearly show the fluid nature of the liquid.

Example 3. Flowing Nature of Liquid in Porous Liquid Oil Using 3D Printed Structure Example 3 demonstrates the liquid nature of the porous liquid oil. The 3D printed structure noted in example 2 was plasma cleaned as described previously. The structure was then introduced to 200 mg of PAO2 oil which contained 5-10 micron hydrophobic solid particles. The solid particles were used to visualize the fluid nature of the liquid infused within the 3D printed structure. The flow of a solid particle was followed using a video camera mounted on the microscope. FIG. 4 shows the time lapse images of the movement of the solid particle in an infused liquid PAO2 oil within the roughness of the porous liquid oil. This example demonstrates that liquid covering the surface in a porous liquid is indeed liquid in nature and can be readily available to interact with a working fluid for separation and reaction.

Example 4. Removing $CO_2$ Using Porous Liquid Amine (Quartz Wool)

Figure 6A:
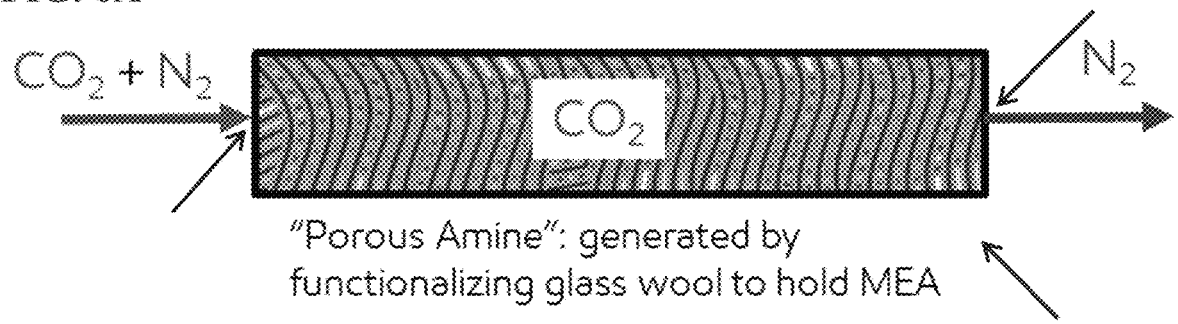
FIG. 6A is a schematic of an exemplary porous liquid containing an amine.

A small amount of quartz wool was placed in a plasma cleaner for 5 minutes. The plasma treatment increased the surface energy of the quartz wool fibers. The high surface energy and natural roughness of the fibers allowed the fibers to be fully wetted by the liquid amine and hold the liquid on its surfaces. Liquid water-free monoethanolamine (MEA) was distributed on the surfaces of the quartz wool to produce a porous liquid MEA (or porous liquid amine; as shown schematically in FIG. 1), with S/V=548 $m^{-1}$ and PI=170.0 $m^{-1}$. Said porous liquid MEA was then mounted in an experimental tube where a 50:50 mixture of $CO_2$ and $N_2$ passed through the porous liquid MEA by sending the gas mixture into the entrance port of the tube (see FIG. 6A). The outlet port of the tube was connected to a mass spectrometer (MS) for gas analysis. The experimental tube was kept in an oven at a temperature of 30° C.

Figure 6B:
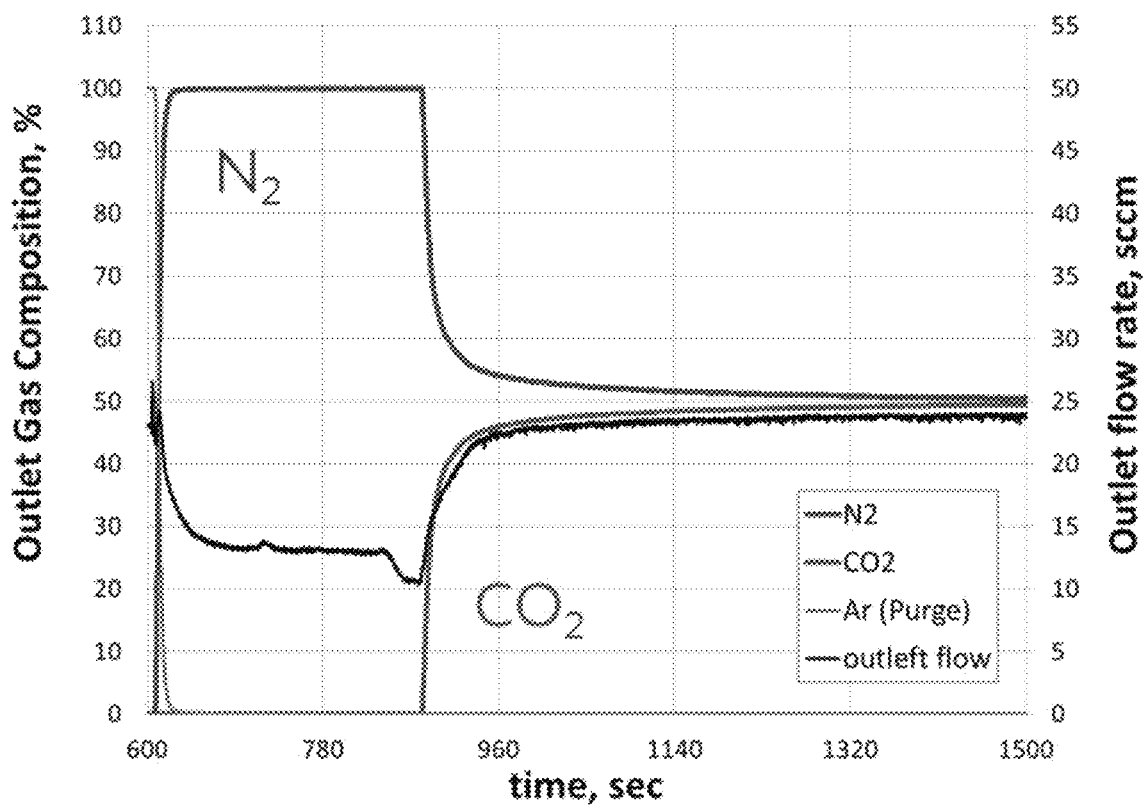
FIGS. 6B and 6C demonstrate the use of an exemplary porous liquid of the present disclosure to remove carbon dioxide from a gaseous mixture, such as flue gas (nitrogen and carbon dioxide mixture were used as an exemplary carbon dioxide gaseous mixture).
Figure 6C:
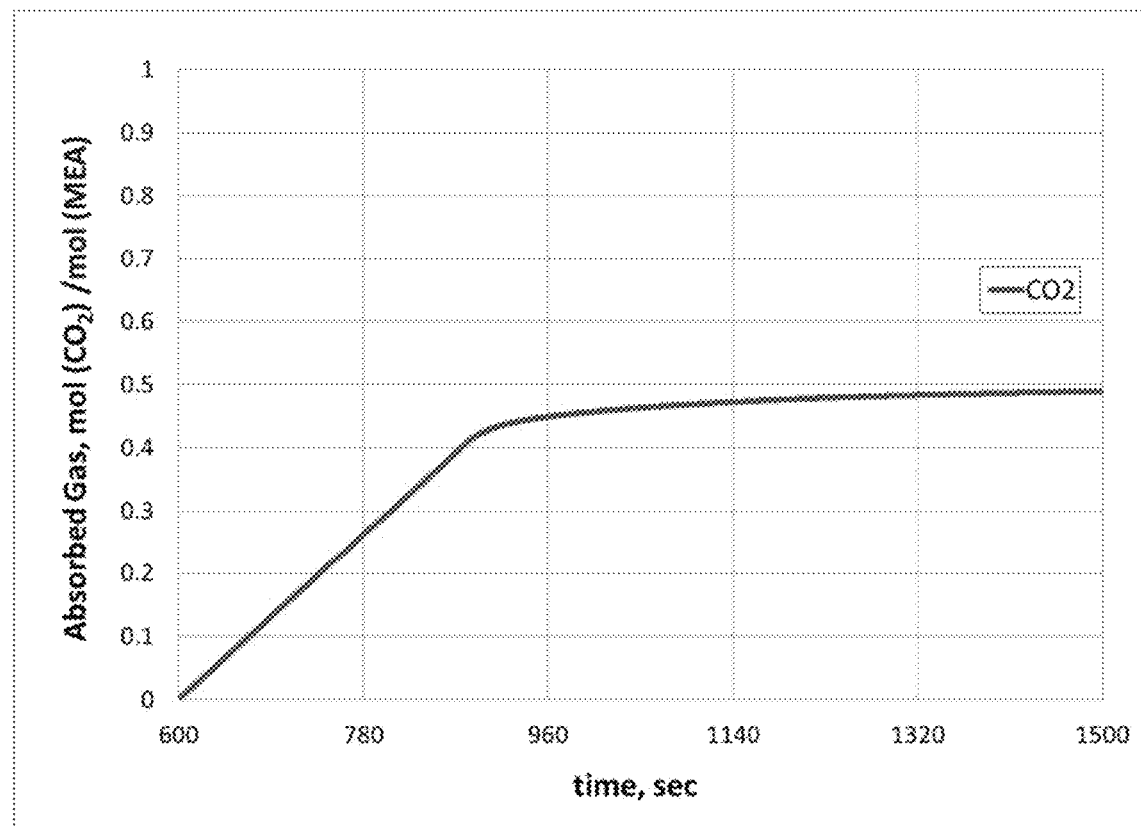

FIG. 6B shows the outlet gas composition and outlet gas flow, and FIG. 6C shows the evolution of $CO_2$ absorption in mmole $CO_2$ per gram of MEA-functionalized quartz wool, obtained from MS analysis. When the gas mixture of $CO_2$ and $N_2$ was passed through the porous liquid amine, all gas $CO_2$ was captured during the first 300 seconds of the experiment, thereby producing pure $N_2$ gas. Calculations of $CO_2$ absorption on amine basis show that, as $CO_2$ absorption reaches the equilibrium, every 2 molecules of MEA captured one molecule of $CO_2$, which is the maximum theoretical value that can be achieved without water present in the amine film. The effective adsorption of $CO_2$ by the porous liquid MEA was due to the high surface area of the liquid amine present in a thin layer on the fibers of quartz wool, which allows the carbon dioxide to react with all of the available amine.

Figure 6D:
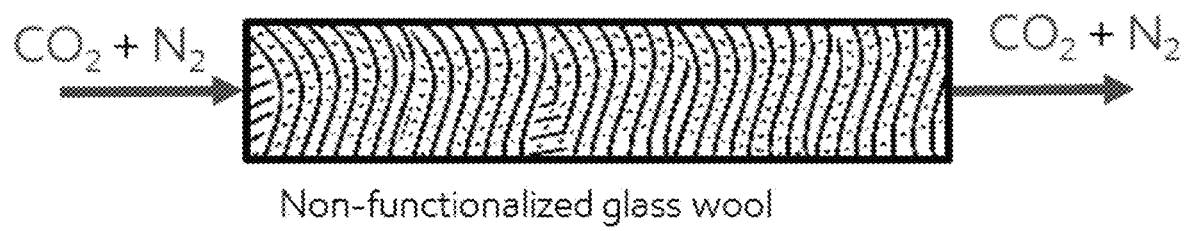
FIG. 6D is a schematic of the control for FIGS. 6A-6C. As shown by FIGS. 6E and 6F, quartz wool is ineffective at absorbing carbon dioxide without the amine containing liquid film of FIGS. 6A-6C.
Figure 6E:
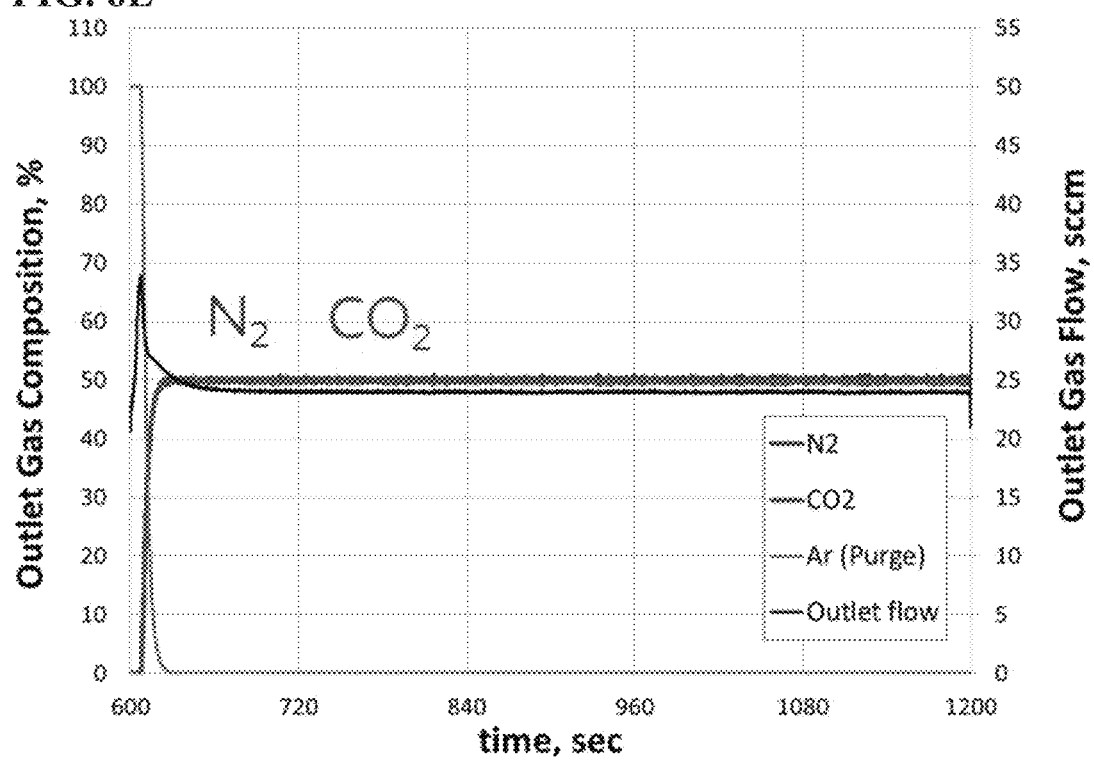
Figure 6F:
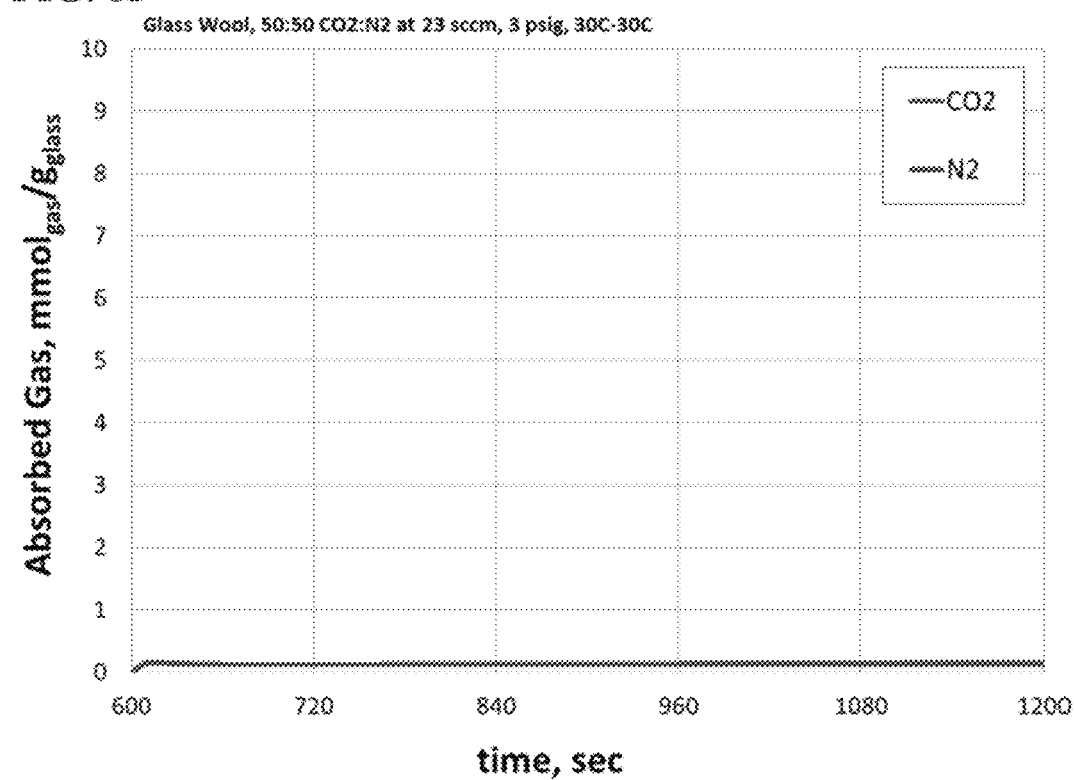

FIG. 6D shows the comparative example when $CO_2/N_2$ gas mixture was sent through an experimental tube with non-functionalized quartz wool. As shown by the outlet gas composition (FIG. 6E), both $CO_2$ and $N_2$ immediately break through the experimental tube and reach the inlet concentration of 50:50, thereby confirming that quartz wool itself is inert to both gases and does not adsorb $CO_2$. A small amount of $N_2$ and $CO_2$ (~0.1 mmol/g) was retained in the inter-wool porosity of the tube (FIG. 6F).

Figure 7A:
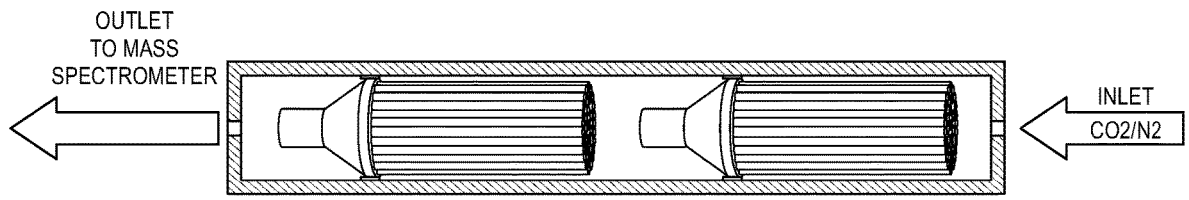
FIG. 7A is a schematic of a porous liquid containing tetraethylenepentamine (TEPA) and having a high PI. It demonstrates the use of an exemplary porous liquid of the present disclosure to remove carbon dioxide from a gaseous mixture, such as flue gas.

Example 5. Removing $CO_2$ Using Porous Liquid Amine and 3D Printed Structure with PI Greater Than 150.0 $m^{-1}$ Two 3D printed structures as described in Example 2 were cleaned with solvent and then with plasma as described in Example 3. A total of 619 mg (0.623 cc) of TEPA was introduced to the two 3D printed structures, generating PI=157.1 $m^{-1}$. The plasma treatment increased the surface energy of the 3D structures. The high surface energy and the roughness allowed the 3D structures to be fully wetted by the liquid amine and hold the liquid on its surfaces, similar to what is shown in FIGS. 3B and 4. The two porous liquid TEPAs were then mounted in an experimental tube where a 50:50 mixture of $CO_2$ and $N_2$ passed through the porous liquid TEPAs by sending the gas mixture into the entrance port of the tube, as shown in FIG. 7A. The temperature of the experimental tube was kept at 130° C. using a block heater during the gas flow. The outlet port of the tube was connected to a mass spectrometer (MS) for gas analysis.

Figure 7B:
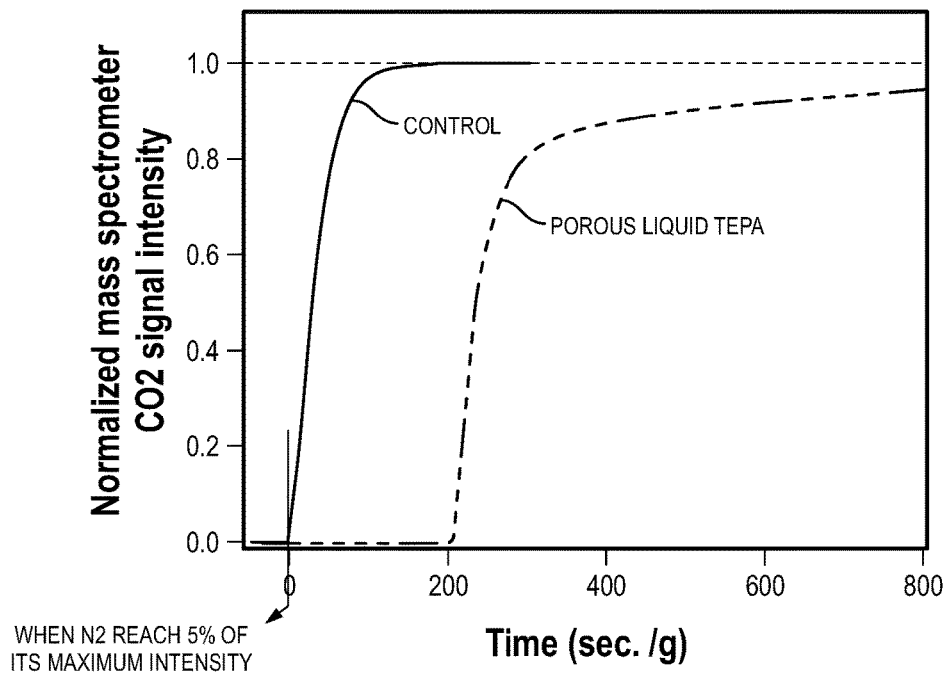
FIG. 7B compares the weight-normalized breakthrough time of porous liquid using TEPA and the same solid substrate not impregnated with any amine (control), at 130° C. The solid is the same as shown in FIG. 3A. The surface chemistry of the 3D printed structure was modified using plasma to make it suitable for liquid impregnation by the amine liquid. As shown by FIG. 7B, the 3D printed solid structure is ineffective at absorbing carbon dioxide without the infused liquid amine.

FIG. 7B shows the variation of the normalized (divided by its maximum intensity) mass spectroscopy signal of CO2 with time, also normalized to the weight of the amine. Time zero is set when N2 gas is detected at 5% of its maximum intensity. The weight-normalized breakthrough time, tbw, is defined when CO2 was detected at 5% of its maximum intensity. FIG. 7B shows that for a significant amount of time (tbw=210 seconds/g), no CO2 was able to escape the porous liquid TEPAs. The tbw of 210 seconds/g is equivalent to the volume normalized breakthrough time, tbv=22 seconds/cc. The time axis in FIG. 7B represents the time per gram of amine when TEPA was used. The ability of amine to capture CO2 at 130 C is very surprising. Normally temperatures above 100° C. have been used to desorb CO2 from amine. However, the ability of the porous liquid TEPA at 130° C. may be due to the liquid property of the infused amine in the porous liquid TEPA. At the elevated temperature, although the chemical reaction between CO2 and amine is weak, the viscosity of the amine is also low. Low viscosity provides a greater diffusion length of CO2 in the infused amine liquid and thus makes more amine available to react with CO2 for removal. This behavior is solely due to the ability of the preserving liquid within the porosity of the surface in the porous liquid TEPA. FIG. 7B also shows the results of an experiment when the said 3D printed structure were prepared as before but this time no amine was introduced to the structure (control). Results indicate that when no amine is infused within the roughness of the 3D printed structure the amount of CO2 removed by the structure is undetectable.

Figure 7C:
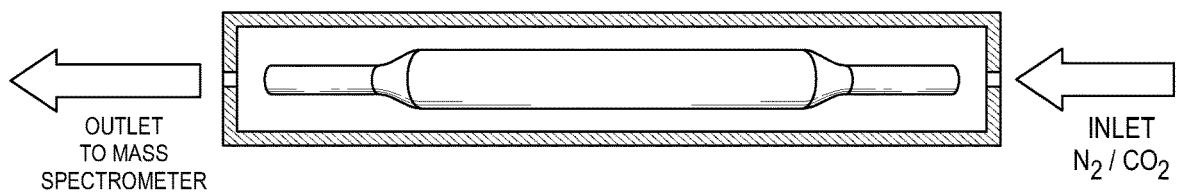
FIG. 7C is a schematic of a porous liquid containing TEPA and having a high PI. It demonstrates the use of an exemplary porous liquid of the present disclosure to remove carbon dioxide from a gaseous mixture, such as flue gas.

The 3D printed structure, as described in Example 2 and shown in FIG. 3C, was cleaned with solvent and then left in an air oven for 3 hours at 400° C. A total of 780 mg of TEPA was introduced to the structure, with PI=168.5 $m^{-1}$. The 400° C. air oven treatment increased the surface energy of the 3D structures. The high surface energy and the roughness allowed the 3D structures to be fully wetted by the liquid amine and hold the liquid on its surfaces. The porous liquid TEPA was then mounted in an experimental setup where a 50:50 mixture of $CO_2$ and $N_2$ passed through the porous liquid TEPA by sending the gas mixture into one end of the tube. The temperature of the experimental tube was kept at 130° C. using a block heater during the gas flow. The outlet port of the tube (the other end of the tube) was connected to a mass spectrometer (MS) for gas analysis, as shown in FIG. 7C.

Figure 7D:
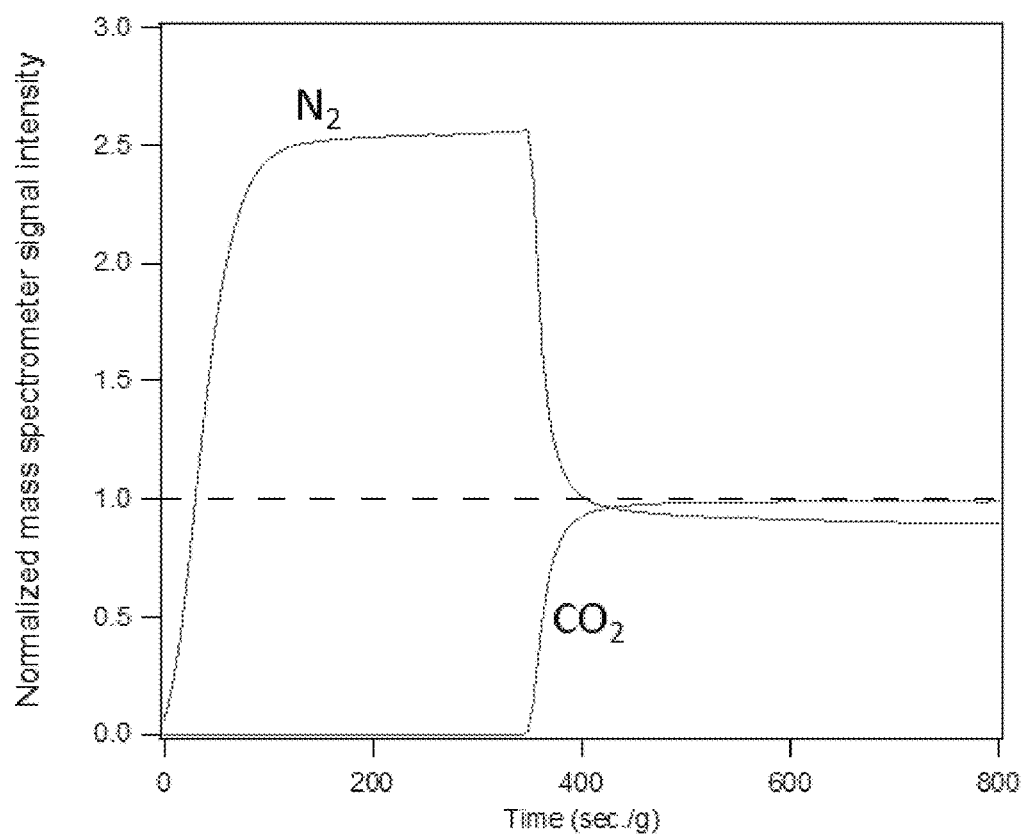
FIG. 7D shows the weight-normalized breakthrough time of porous liquid using TEPA at 130° C. The variation in mass spectrometer N2 signal intensity with time is also shown. Time zero is when the signal intensity of N2 reaches 5% of its maximum value. The surface chemistry of the 3D printed structure was modified by leaving the structure in an air oven for 3 hours at 400° C. This makes it suitable for liquid impregnation by the amine liquid. As shown by FIGS. 7B and 7D, the porous liquid TEPA is effective at absorbing carbon dioxide.

FIG. 7D shows the variation of the normalized (divided by its maximum intensity) mass spectroscopy signal of CO2 with time. Time zero is set when N2 gas is detected at 5% of its maximum intensity. The breakthrough time normalized to the weight of the amine, tbw, is defined when CO2 was detected at 5% of its maximum intensity. FIG. 7D shows that for a significant amount of time (tbw=348 seconds/g) no CO2 was able to escape the porous liquid TEPA. The time axis in FIG. 7D represents the time per gram of amine when TEPA was used. The tbw of 348 seconds/g is equivalent to the volume normalized breakthrough time, tbv of 39 seconds/cc. The ability of amine to capture CO2 at 130° C. is very surprising. Normally temperatures above 100° C. have been used to desorb CO2 from amine. However, the ability of the porous liquid TEPA at 130° C. may be due to the liquid property of the infused amine in the porous liquid TEPA.

Example 6. Removing $CO_2$ Using Porous Liquid Amine and Ceramic Monolith with PI Less than 150.0 $m^4$ An effective porous liquid possesses an appropriate surface chemistry that is able to be wetted by the liquid and an appropriate surface texture or roughness to have a PI greater than 150 $m^{-1}$. In this example, two ceramic monoliths with a high S/V of 2300 $m^{-1}$ were used without any surface modification.

Figure 7E:
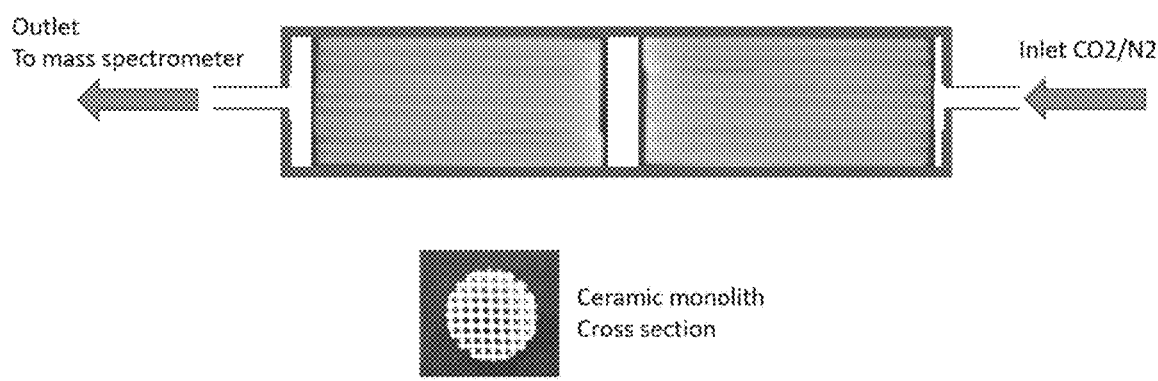
FIG. 7E is a schematic of an exemplary porous liquid containing TEPA and having a low PI. It demonstrates the use of an exemplary porous liquid of the present disclosure to remove carbon dioxide from a gaseous mixture, such as flue gas.

Introducing TEPA to the two ceramic monoliths produced a total of 311 mg (0.313 cc) of the amine infused on the surface of the monoliths, with PI=135.1 $m^{-1}$. The monoliths were then mounted in an experimental tube, where a 50:50 mixture of $CO_2$ and $N_2$ passed through the porous liquid TEPAs through the entrance ports, as shown in FIG. 7E. The temperature of the experimental tube was kept at 130° C. using a block heater during the gas flow. The outlet port of the tube was connected to a mass spectrometer (MS) for gas analysis.

Figure 7F:
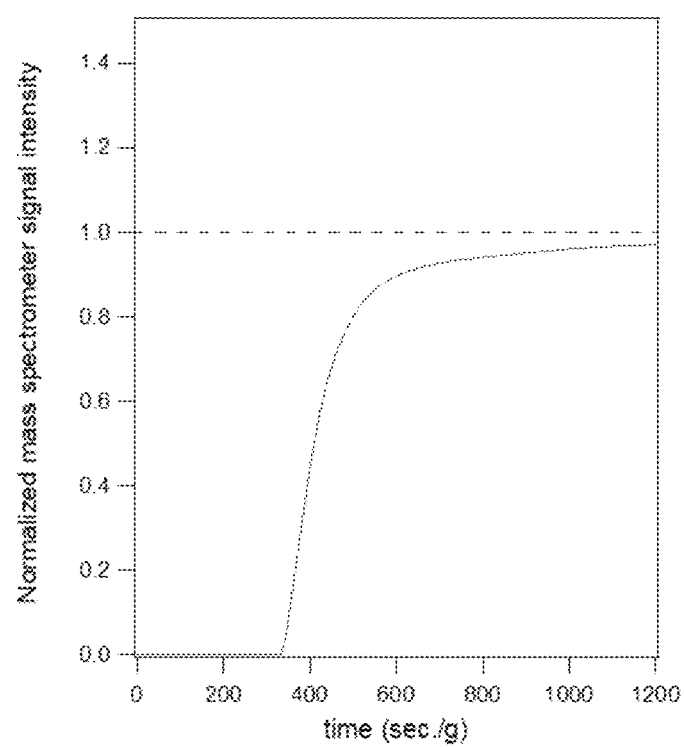
FIG. 7F shows the weight normalized breakthrough time of porous liquid using TEPA at 130° C. No surface modification was used for this ceramic monolith.

FIG. 7F shows the variation of the normalized (divided by its maximum intensity) mass spectroscopy signal of CO2 with time. Time zero is set when N2 gas is detected at 5% of its maximum intensity. The weight breakthrough is time normalized to the weight of the amine, tbw, and defined when CO2 was detected at 5% of its maximum intensity. FIG. 7F shows that for a significant amount of time (tbw=321 seconds/g), no CO2 was able to escape this porous liquid TEPA. The tbw of 321 seconds/g is equivalent to the volume normalized breakthrough time, tbv=19 seconds/cc. Although the tbw is comparable with the porous liquid TEPA impregnated structures described in Example 5, the tbv is significantly lower than that of the 3D printed examples. A low PI of 135.1 $m^{-1}$ represents a low value of V1/V of only 0.059. This in turn, forces higher volume of reactor to be used for CO2 capture. A PI of greater than 150.0 $m^{-1}$, such as in Example 5, with V1/V porous liquid TEPA of 0.1, reduces the reactor volume by two times.

Example 7. Removing Water Using Porous Liquid Triethylene Glycol

A small amount of quartz wool was placed in a plasma cleaner for 5 minutes. Liquid triethylene glycol (TEG) was distributed on the surfaces of quartz wool to produce a porous liquid TEG (as shown schematically in FIG. 1). The said porous liquid TEG was then mounted in an experimental tube where wet hydrocarbon gas passed over the porous liquid TEG by sending the wet hydrocarbon through the entrance port of the tube (see FIG. 8). The exit port of the tube was connected to FTIR (Fourier transform infrared spectroscopy) for gas analysis. The wet hydrocarbon gas was produced by bubbling $N_2$ gas into water in the presence of heptane.

Figure 8:
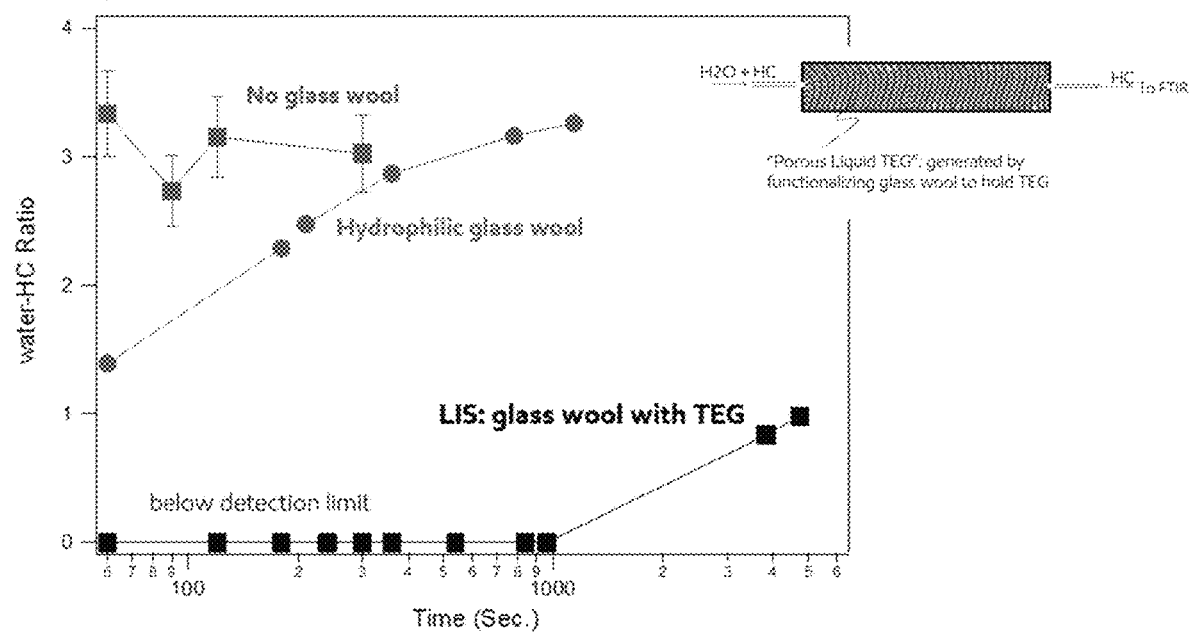
FIG. 8 shows the water/hydrocarbon relative concentration ratio of gas exiting an experimental tube that includes a glycol containing porous liquid triethylene glycol (TEG), quartz wool without a liquid film (control), or that is empty.

FIG. 8 shows the variation of water/hydrocarbon concentration ratio of gas exiting the experimental tube, as determined by FTIR analysis. FIG. 8 demonstrates that when no porous liquid TEG or quartz wool is present in the experimental tube (squares; hereinafter, the "Reference"), a significant amount of water passes through the sampling tube. When a plasma treated quartz wool was used in the experimental tube (circles; labeled as "hydrophilic quartz wool") the amount of water reduces with respect to the Reference. However, this effect is short lived. When porous liquid TEG was used in the experimental tube (squares; labeled as "LIS: quartz wool with TEG liquid infused on its surface") the concentration of water reduces to below the limit of detection of the FTIR (indicated by zero in the graph). This effect lasts much longer than when the plasma treated quartz wool with no TEG was utilized. Thus, the effective removal of water with porous liquid TEG is due to the high surface area of the liquid TEG that is present in a thin layer on the porous liquid TEG.

Example 8. Removal of Furfural from Aqueous Solution

Liquid toluene was distributed on the surfaces of polyethylene (PE) wool to produce porous liquid toluene (as shown schematically in FIG. 1). In this example, polyethylene wool was used to ensure wettability of toluene on the PE fibers in the presence of water. Porous liquid toluene was then immersed in a 5 g/L aqueous solution of furfural. After moving the porous liquid toluene around in the aqueous furfural solution, the remaining aqueous furfural solution was taken for UV-Vis analysis.

Figure 9A:
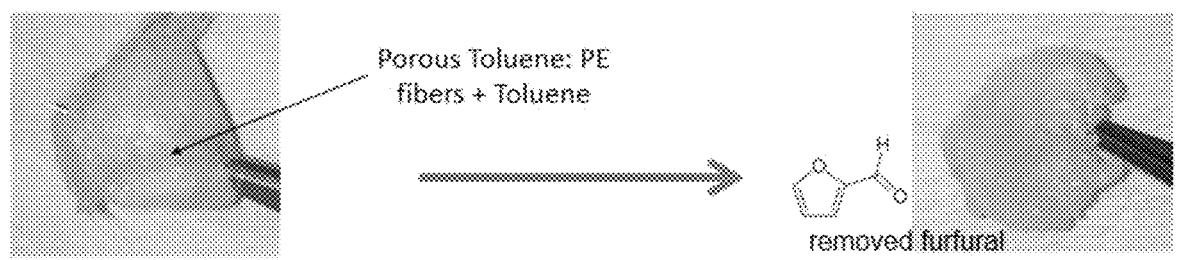
FIG. 9A shows an exemplary porous liquid toluene before (left) and after (right) immersion in an aqueous furfural solution. The porous liquid toluene efficiently absorbed furfural from the solution, as demonstrated by the yellow-brown color of the porous liquid after immersion in the furfural solution (right).
Figure 9B:
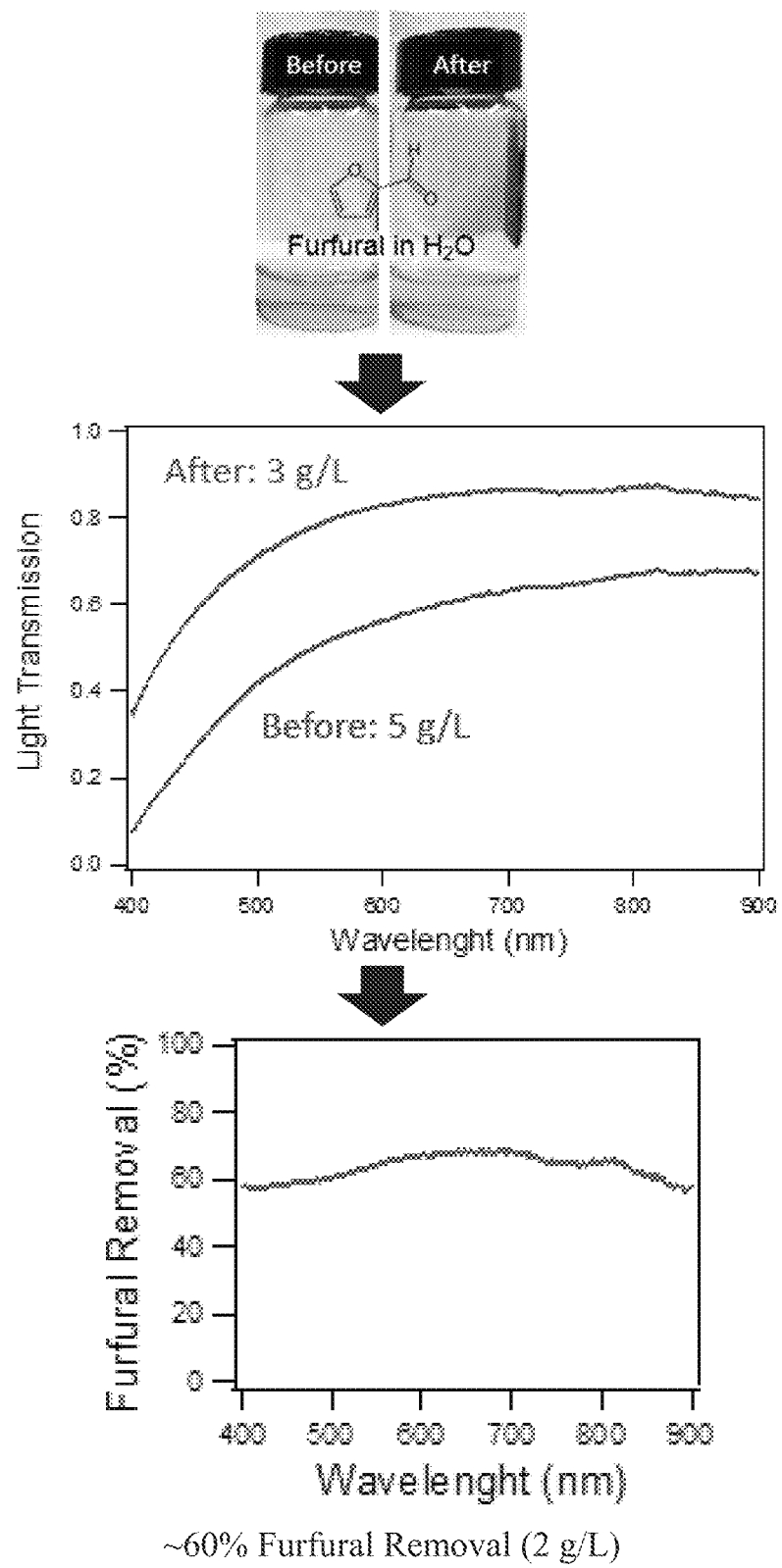
FIG. 9B illustrates the UV-Vis analysis of the furfural solution before and after it has been contacted with the porous liquid toluene. A significant amount of furfural was removed by the treatment of the solution with the porous liquid toluene.

FIG. 9A shows the porous liquid toluene before and after immersion in the furfural solution. The yellow-brown color of the porous liquid toluene observed after coming into contact with the furfural solution is due to absorption of the furfural by the porous liquid toluene. FIG. 9B shows UV-Vis analysis of the before and after furfural solution. As can be seen by looking at the vials showing the furfural solution before and after coming into contact with the porous liquid toluene, a significant amount of furfural was removed from the solution. In fact, as demonstrate by the US-Viz analysis, the porous liquid toluene was able to remove approximately 60% of furfural from the furfural solution.

Example 9. Immobilization of Enzyme Using Porous Liquid Water

A small amount of quartz wool was treated with plasma for 5 minutes and then immediately immersed in the aqueous buffer with 2 μM of cytochrome c. After thorough distribution of the liquid on the quartz wool, excess enzyme solution was squeezed out from the quartz wool to produce a porous aqueous enzyme (PAE). The PAE was used for the oxidation of nickel octaethylporphyrin (NiOEP). The enzymatic reaction was accomplished by placing the PEA in contact with a mixture that contained the following: 10% (v/v) phosphate-buffered saline (1×), 90% (v/v) toluene with dissolved ~16.7 μM NiOEP, 100 mM tert-butyl hydroperoxide. The reactions were incubated at room temperature for 24 hours on a rocker and rotated at 25 rpm/min.

Figure 10:
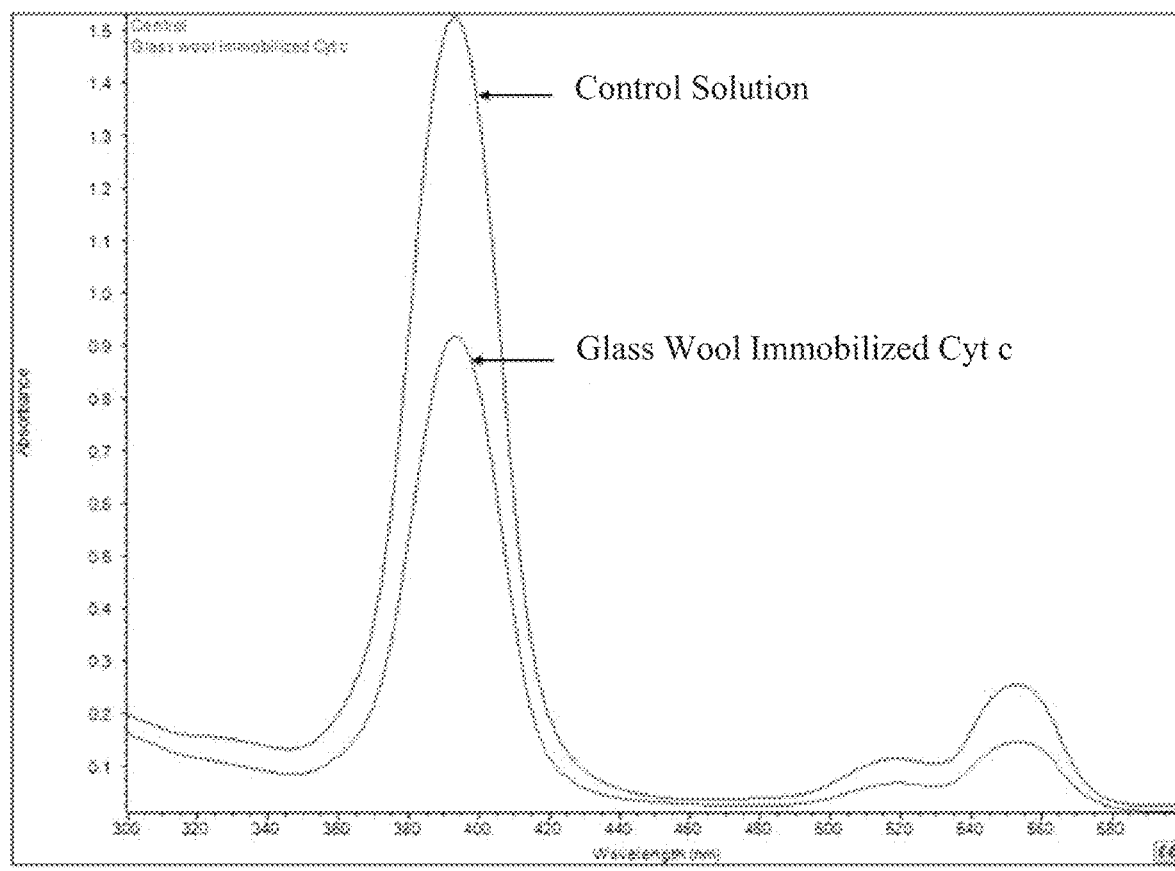
FIG. 10 shows degradation of nickel octaethylporphyrin with a porous liquid enzyme of the present disclosure with cytochrome c immobilized on quartz wool, as well as a no treatment control.

FIG. 10 shows the UV-vis analysis of the reacted solution after the 24 hour incubation. The height of the characteristic Soret band at ~393 nm for NiOEP treated with PAE was reduced as compared to the control solution without enzyme. Analysis indicates that about 41.3% of NiOEP was oxidized by the incubation with the PAE. Due to the limitation in mass transfer of hydrophobic NiOEP from organic solvent to aqueous phase, the free cytochrome c has limited access to NiOEP and does not show activity for oxidation.

This example demonstrates that a significant increase in oxidative activity occurs when an enzyme is immobilized on PAE.

Thus, the articles of the present disclosure allow for the immobilization of a thin layer of enzyme solution on the surface of the carrier without using time-consuming, complicated or expensive enzyme immobilization methods. When the enzymatic reaction is carried out in a neat organic phase, the retained thin layer of aqueous phase not only increases the surface area of the interface between enzyme solution and the organic phase which contains substrates for enhanced enzymatic activities, but also provides optimal conditions for regeneration of water soluble cofactors for the enzymes. Similarly, one could retain a thin layer of the enzyme in an organic phase, while the enzymatic reaction is carried out in a neat aqueous phase.

The contents of all references, patents, pending patent applications and published patents, cited throughout this application are hereby expressly incorporated herein by reference.

Those skilled in the art will recognize, or be able to ascertain using no more than routine experimentation, many equivalents to the specific embodiments of the disclosure described herein. Such equivalents are intended to be encompassed by the following claims. It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

The invention claimed is:

1. A porous liquid or a porous liquid enzyme comprising:
a high surface area solid having a surface area of greater than 0.001 $m^2/g$ and an S/V of greater than 180 $m^{-1}$, wherein S is the surface area of the high surface area solid and V is the volume of the high surface area solid, and
wherein the high surface area solid includes wool, glass, glass wool, polyethylene wool, quartz wool, fibers, or a combination thereof;
and
a liquid film coating at least 30% of the surface area of the high surface area solid.

2. The porous liquid of claim 1, wherein the high surface area solid further comprises a rough surface, a textured surface, or both.

3. The porous liquid of claim 1, wherein the high surface area solid comprises a matrix of solid features spaced sufficiently close to stably contain a liquid therebetween such that the solid features have an average dimension of 0.1 um to 1000 um and/or an average distance between them of 0.1 um to 500 um.

4. The porous liquid of claim 1, wherein the high surface area solid is made of a material that is not reactive with the liquid film.

5. The porous liquid of claim 1, further comprising a working fluid forming a liquid-fluid interface with the liquid film.

6. The porous liquid of claim 1, further comprising an S/V of greater than 500 $m^{-1}$, wherein S is the surface area of the high surface area solid and V is the volume of the high surface area solid.

7. The porous liquid of claim 1, further comprising a fluid in contact with the liquid film and a performance index, PI, of at least 150 $m^{-1}$.

8. The porous liquid of claim 5, wherein the liquid film facilitates mass transfer of at least one substance or substrate across the liquid-fluid interface.

9. The porous liquid of 1, wherein the liquid film includes at least one of:
an amine;
an alkali metal hydroxide;
glycol;
an enzyme;
a thickness from the bottom of the roughness or the texture to the top surface of the liquid film no greater than 1400 µm; or
a combination thereof.

10. A method of performing a liquid-based extraction, the method comprising:
contacting (1) a porous liquid comprising a high surface area solid and a liquid film, wherein the high surface area solid has a surface area of greater than 0.001 $m^2/g$, and wherein the high surface area solid includes wool, glass, glass wool, polyethylene wool, quartz wool, fibers, or a combination thereof, such that:
i) the liquid film coats at least 30% of the surface area of the high surface area solid,
ii) the porous liquid has an S/V greater than 180 $m^{-1}$ wherein S is the surface area of the high surface area solid and V is the volume of the high surface area solid, and
iii) the performance index (PI) is at least 150 $m^{-1}$; and
(2) a fluid that is immiscible with the liquid film such that a liquid-fluid interface is produced, wherein at least one substance in the fluid is extracted by the liquid film resulting in mass transfer across the liquid-fluid interface.

11. The method of claim 10, wherein the liquid film has a contact angle on the high surface area solid in the presence of the fluid that is less than about 15 degrees.

12. The method of claim 10, wherein the fluid is a gas.

13. The method of claim 12, wherein at least one of:
the fluid includes carbon dioxide;
the liquid film includes an amine, potassium hydroxide, or both; or a combination thereof.

14. The method of claim 10 or 11, wherein at least one of:
the fluid includes water;
the liquid film includes glycol; or
combinations thereof.

15. The method of claim 10 or 11, wherein the fluid is a liquid.

16. The method of claim 10 or 11, wherein at least one of: the fluid includes furfural or the liquid film includes toluene.

17. The method of claim 10, wherein the porous liquid is the porous liquid of claim 1.

18. A method of performing an enzymatic reaction, the method comprising:

contacting (1) a porous liquid enzyme comprising a high surface area solid and a liquid film comprising an enzyme, wherein the high surface area solid has a surface area of greater than 0.001 m$^2$/g, and wherein the high surface area solid includes wool, glass, glass wool, polyethylene wool, quartz wool, fibers, or a combination thereof, such that
   i) the liquid film coats at least 30% of the surface area of the high surface area solid,
   ii) the porous liquid enzyme has an S/V of greater than 180 m' wherein S is the surface area of the high surface area solid and V is the volume of the high surface area solid, and
   iii) the performance index (PI) is at least 150 m$^{-1}$; and (2) a fluid comprising at least one substrate for the enzyme in the liquid film, wherein the fluid is immiscible with the liquid film such that a liquid-fluid interface is produced, and wherein contacting the fluid and the porous liquid enzyme results in at least one of the catalysis of the substrate, mass transfer of the substrate across the liquid-fluid interface, or both.

19. The method of claim 18, wherein the liquid film has a contact angle on the high surface area solid in the presence of the fluid that is less than about 15 degrees.

20. The method of claim 18, wherein the liquid film is an aqueous solution and the fluid is an organic solution.

21. The method of claim 18, wherein the enzyme comprises cytochrome c, the substrate comprises nickel octaethylporphyrin, and the high surface area solid comprises wool.

* * * * *